United States Patent
Kubota et al.

(10) Patent No.: US 9,804,359 B2
(45) Date of Patent: Oct. 31, 2017

(54) IMAGING LENS

(71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Hisao Fukaya, Tochigi (JP)

(73) Assignees: OPTICAL LOGIC INC., Nagano (JP); KANTATSU CO., LTD., Tochigi (JP)

( * ) Notice: Subject to any disclaimer, the term of this patent is extended or adjusted under 35 U.S.C. 154(b) by 76 days.

(21) Appl. No.: 14/945,422

(22) Filed: Nov. 18, 2015

(65) Prior Publication Data
US 2016/0313536 A1  Oct. 27, 2016

(30) Foreign Application Priority Data

Apr. 22, 2015 (JP) ................. 2015-087328

(51) Int. Cl.
*G02B 9/62* (2006.01)
*G02B 13/00* (2006.01)

(52) U.S. Cl.
CPC ........... *G02B 9/62* (2013.01); *G02B 13/0045* (2013.01)

(58) Field of Classification Search
CPC .............. G02B 13/0045; G02B 9/60–9/64
USPC ................................ 359/749–758
See application file for complete search history.

(56) References Cited

U.S. PATENT DOCUMENTS

| 3,976,365 | A | * | 8/1976 | Nakagawa | G02B 9/64 359/750 |
|---|---|---|---|---|---|
| 4,143,944 | A | * | 3/1979 | Takahashi | G02B 13/04 359/750 |
| 8,743,482 | B1 | | 6/2014 | Tsai et al. | |
| 8,854,745 | B1 | | 10/2014 | Chen | |
| 9,013,807 | B1 | | 4/2015 | Tsai et al. | |
| 2001/0024332 | A1 | * | 9/2001 | Mori | G02B 13/04 359/755 |
| 2013/0033762 | A1 | | 2/2013 | Tsai et al. | |
| 2013/0070346 | A1 | | 3/2013 | Hsu et al. | |
| 2013/0314804 | A1 | * | 11/2013 | Kubota | G02B 13/0015 359/757 |
| 2014/0071542 | A1 | | 3/2014 | Jung et al. | |
| 2014/0111876 | A1 | | 4/2014 | Tang et al. | |
| 2014/0153113 | A1 | | 6/2014 | Tsai et al. | |
| 2014/0185141 | A1 | | 7/2014 | Lee et al. | |
| 2014/0192422 | A1 | | 7/2014 | Tang et al. | |
| 2014/0204478 | A1 | * | 7/2014 | Asami | G02B 13/06 359/752 |

(Continued)

FOREIGN PATENT DOCUMENTS

JP         2013-195587 A     9/2013

*Primary Examiner* — Bumsuk Won
*Assistant Examiner* — Jeffrey Madonna
(74) *Attorney, Agent, or Firm* — Kubotera & Associates, LLC

(57) ABSTRACT

An imaging lens includes a first lens having positive refractive power; a second lens having negative refractive power; a third lens having negative refractive power; a fourth lens; a fifth lens; and a sixth lens having negative refractive power, arranged in this order from an object side to an image plane side. The fourth lens and the fifth lens have a composite focal length f45, and the third lens has an Abbe's number vd3 so that the following conditional expressions are satisfied:

$0 < f45,$ $40 < vd3 < 75.$

15 Claims, 15 Drawing Sheets

(56) References Cited

U.S. PATENT DOCUMENTS

| | | | |
|---|---|---|---|
| 2015/0070783 A1* | 3/2015 | Hashimoto | G02B 13/0045 |
| | | | 359/708 |
| 2015/0146309 A1 | 5/2015 | Ota | |
| 2015/0160435 A1 | 6/2015 | Chen et al. | |
| 2015/0177489 A1 | 6/2015 | Hashimoto | |
| 2015/0260953 A1 | 9/2015 | Ota et al. | |
| 2015/0260954 A1 | 9/2015 | Ota et al. | |
| 2015/0268447 A1 | 9/2015 | Huang | |
| 2015/0277085 A1 | 10/2015 | Noda | |
| 2015/0338611 A1* | 11/2015 | Jung | G02B 13/0045 |
| | | | 359/713 |
| 2015/0362702 A1 | 12/2015 | Tang et al. | |
| 2016/0004038 A1 | 1/2016 | Huang | |
| 2016/0041369 A1 | 2/2016 | Tang et al. | |
| 2016/0124192 A1 | 5/2016 | Koreeda | |
| 2016/0131872 A1 | 5/2016 | Tang et al. | |
| 2016/0161713 A1 | 6/2016 | Huang | |
| 2016/0170182 A1 | 6/2016 | Tanaka | |
| 2016/0187620 A1 | 6/2016 | Huang | |
| 2016/0187621 A1 | 6/2016 | Chen | |
| 2016/0187622 A1 | 6/2016 | Huang | |
| 2016/0216485 A1 | 7/2016 | Chen et al. | |
| 2016/0313536 A1* | 10/2016 | Kubota | G02B 13/0045 |

* cited by examiner

IMAGING LENS

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera to be built in a cellular phone, a portable information terminal, or the like, a digital still camera, a security camera, a vehicle onboard camera, and a network camera.

In these years, in place of cellular phones that are intended mainly for making phone calls, so-called "smartphones", i.e., multifunctional cellular phones which can run various application software as well as a voice call function, have been more widely used. When application software is run on smartphones, it is possible to perform functions such as those of digital still cameras and car navigation systems on the smartphones. In order to perform those various functions, most models of smartphones include cameras.

Generally speaking, product groups of such smartphones are often composed according to specifications for beginners to advanced users. Among them, an imaging lens to be mounted in a product designed for the advanced users is required to have a high-resolution lens configuration so as to be also applicable to a high pixel count imaging element of these years, as well as a small size.

As a method of attaining the high-resolution imaging lens, there has been a method of increasing the number of lenses that compose the imaging lens. However, the increase of the number of lenses easily causes an increase in the size of the imaging lens. Therefore, the lens configuration having a large number of lenses has a disadvantage in terms of mounting in a small-sized camera such as the above-described smartphones. Accordingly, in development of the imaging lens, it has been necessary to focus on shortening a total track length, while attaining high resolution of the imaging lens.

However, with rapid advancement in achieving the higher pixel count of an imaging element and image processing technology in these days, an imaging lens has been developed so as to attain higher resolution rather than a shorter total track length of the imaging lens. There was also a recent attempt to attach a separate camera unit onto a smartphone, whereby it is possible to obtain images equivalent to those of digital still cameras. Configuring a camera separately from a smartphone in this way, it is easy to mount a high-resolution imaging lens in a camera.

In case of a lens configuration composed of six lenses, due to the large number of lenses of the imaging lens, it has high flexibility in design. In addition, it has potential to attain satisfactory correction of aberrations, which are necessary for high-resolution imaging lenses, and downsizing of the imaging lens in a balanced manner. For example, as the imaging lens having the six-lens configuration as described above, an imaging lens described in Patent Reference has been known.

Patent Reference: Japanese Patent Application Publication No. 2013-195587

The imaging lens described in Patent Reference includes a first lens that is positive and directs a convex surface thereof to an object side, a second lens that is negative and directs a concave surface thereof to an image plane side, a third lens that is negative and directs a concave surface thereof to the object side, a fourth and fifth lenses that are positive and direct convex surfaces thereof to the image plane side, and a sixth lens that is negative and directs a concave surface thereof to the object side. According to the conventional imaging lens of Patent Reference, by satisfying conditional expressions of a ratio between a focal length of the first lens and a focal length of the third lens and a ratio between a focal length of the second lens and a focal length of the whole lens system, it is achievable to satisfactorily correct a distortion and a chromatic aberration.

Each year, functions and sizes of cellular phones and smartphones are getting higher and smaller, and the level of a small size required for an imaging lens is even higher than before. In case of the imaging lens of Patent Reference, since a distance from an object-side surface of the first lens to an image plane of an imaging element is long, there is a limit by itself to achieve satisfactory correction of aberrations while downsizing the imaging lens to satisfy the above-described demands. It is achievable to reduce the level of downsizing required for an imaging lens by providing a camera as a separate unit from cellular phones or smartphones. However, in terms of convenience or portability, cellular phones or smartphones with built-in cameras are still dominantly preferred. Therefore, there remains such a strong demand for small imaging lenses with high resolution.

Here, such a problem is not specific to the imaging lens to be mounted in cellular phones and smartphones. Rather, it is a common problem even for an imaging lens to be mounted in a relatively small camera such as digital still cameras, portable information terminals, security cameras, vehicle onboard cameras, and network cameras.

In view of the above-described problems in conventional techniques, an object of the present invention is to provide an imaging lens that can attain both downsizing thereof and satisfactory aberration correction.

Further objects and advantages of the present invention will be apparent from the following description of the present invention.

SUMMARY OF THE INVENTION

In order to attain the objects described above, according to a first aspect of the present invention, an imaging lens includes a first lens having positive refractive power; a second lens having negative refractive power; a third lens having negative refractive power, a fourth lens; a fifth lens; and a sixth lens having negative refractive power, arranged in the order from an object side to an image plane side.

According to the first aspect of the present invention, when a composite refractive power of the fourth lens and the fifth lens is f45 and the third lens has an Abbe's number vd3, the imaging lens of the present invention satisfies the following conditional expressions (1) and (2):

$$0 < f45 \qquad (1)$$

$$40 < vd3 < 75 \qquad (2)$$

According to the first aspect of the present invention, both the second lens and the third lens have negative refractive power. As shown in the conditional expression (1), the fourth lens and the fifth lens respectively have refractive power such that the composite refractive power of them is positive. Therefore, the arrangement of refractive powers in the imaging lens according to the present invention is positive of the first lens, negative of the second and the third lenses, positive of the fourth and the fifth lenses, and negative of the sixth lens in the order from the object side.

Such lens configuration, in which positive refractive power and negative refractive power is alternately arranged, is very effective configuration to restrain the Petzval sum.

When the imaging lens satisfies the conditional expression (1), it is achievable to restrain astigmatism, a field curvature, and a chromatic aberration within preferred ranges in a balanced manner, while keeping the Petzval sum of the whole lens system at near zero. If the value is outside the range of the conditional expression (1), an image-forming surface curves towards the object side, i.e., a state where the field curvature is insufficiently corrected. Therefore, it is difficult to obtain satisfactory image-forming performance.

When the imaging lens satisfies the conditional expression (2), it is achievable to satisfactorily correct the chromatic aberration. If the value is not within the range of the conditional expression (2), the chromatic aberration of magnification is excessively corrected (an image-forming point at a short wavelength moves in a direction to be away from the optical axis relative to that at a reference wavelength). Therefore, it is difficult to obtain satisfactory image-forming performance.

According to the present invention, downsizing of the imaging lens is achieved by the positive refractive power of the first lens, which is disposed closest to the object. In order to attain small size with such lens configuration, the first lens needs to have strong refractive power. However, when the first lens has strong refractive power, it is also necessary for the lenses disposed closer to the image plane side than the first lens, to have strong refractive powers. In this case, it is typically difficult to correct aberrations. At this viewpoint, according to the imaging lens of the present invention, negative refractive power is shared between the two lenses, the second lens and the third lens. Therefore, it is possible to keep the refractive powers of the second lens and the third lens respectively weak, and it is achievable to satisfactorily correct the aberrations.

When the whole lens system has a focal length f, the imaging lens having the above-described configuration preferably satisfies the following conditional expression (3):

$$0.5 < f45/f < 2.5 \quad (3)$$

When the imaging lens satisfies the conditional expression (3), it is achievable to satisfactorily correct a distortion and astigmatism while downsizing of the imaging lens. In addition, when the imaging lens satisfies the conditional expression (3), it is also achievable to restrain an incident angle of a light beam emitted from the imaging lens to an imaging element within the range of a chief ray angle (CRA). As is well known, a so-called chief ray angle (CRA) is set in advance for an imaging element, i.e. a range of an incident angle of a light beam that can be taken in the image plane. When a light beam outside the range of CRA enters the imaging element, "shading" occurs, which is an obstacle for achieving satisfactory image-forming performance.

When the value exceeds the upper limit of 2.5 in the conditional expression (3), it is easy to restrain the incident angle of a light beam emitted from the imaging lens within the range of CRA. However, in the astigmatism, a sagittal image surface tilts to the object side, so that an astigmatic difference increases. Moreover, the distortion increases in a negative direction, so that it is difficult to obtain satisfactory image-forming performance. On the other hand, when the value is below the lower limit of 0.5, it is advantageous for downsizing of the imaging lens. However, it is difficult to restrain the incident angle of a light beam emitted from the imaging lens within the range of CRA. Moreover, in the astigmatism, the sagittal image surface tils towards the image plane side. Therefore, the astigmatic difference increases, and the distortion increases in a positive direction. As a result, it is difficult to obtain satisfactory image-forming performance.

When the first lens has a focal length f1, and a composite focal length of the second lens and the third lens is f23, the imaging lens having the above-described configuration preferably satisfies the following conditional expression (4):

$$-1.2 < f1/f23 < -0.2 \quad (4)$$

When the imaging lens satisfies the conditional expression (4), it is possible to satisfactorily correct the field curvature and the chromatic aberration, while downsizing the imaging lens. When the value exceeds the upper limit of −0.2, it is advantageous for downsizing of the imaging lens. However, it is difficult to secure a back focal length. Moreover, the axial chromatic aberration is insufficiently corrected (a focal position at a short wavelength moves to the object side relative to that at a reference wavelength). In addition, the chromatic aberration of magnification is insufficiently corrected (an image-forming point at a short wavelength moves in a direction to be close to the optical axis relative to that at a reference wavelength). The image-forming surface curves to the object side, and the field curvature is insufficiently corrected. Therefore, it is difficult to obtain satisfactory image-forming performance. On the other hand, when the value is below the lower limit of −1.2, it is easy to secure the back focal length. However, it is difficult to downsize the imaging lens. Moreover, the axial chromatic aberration is excessively corrected (a focal position at a short wavelength moves to the image plane side relative to that at a reference wavelength). In addition, the chromatic aberration of magnification is excessively corrected. Therefore, it is difficult to obtain satisfactory image-forming performance.

When the whole lens system has a focal length f and the third lens has a focal length f3, the imaging lens having the above-described configuration satisfactorily satisfies the following conditional expression (5):

$$-30 < f3/f < -10 \quad (5)$$

When the imaging lens satisfies the conditional expression (5), it is possible to restrain the distortion, the astigmatism, and a coma aberration within satisfactory ranges in a balanced manner. When the value exceeds the upper limit of −10, in the astigmatism, the sagittal image surface tilts to the image plane side, and the astigmatic difference increases. In addition, an inner coma aberration increases, and the distortion increases in a positive direction. Therefore, it is difficult to obtain satisfactory image-forming performance. On the other hand, when the value is below the lower limit of −30, it is advantageous for downsizing the imaging lens. However, in the astigmatism, the sagittal image surface tilts to the object side, and the astigmatic difference increases. In addition, an outer coma aberration increases. Therefore, it is difficult to obtain satisfactory image-forming performance.

When the whole lens system has the focal length f and the sixth lens has a focal length f6, the imaging lens having the above-described configuration preferably satisfies the following conditional expression (6):

$$-2.0 < f6/f < -0.5 \quad (6)$$

When the imaging lens satisfies the conditional expression (6), it is achievable to satisfactorily correct the field curvature, the distortion, and the chromatic aberration, while downsizing the imaging lens. When the value exceeds the upper limit of −0.5, it is advantageous for downsizing the imaging lens. However, it is difficult to secure the back focal length. In addition, in the astigmatism, the sagittal image surface tilts to the image plane side, and the astigmatic difference increases. In addition, the distortion increases in a positive direction. Therefore, it is difficult to obtain satisfactory image-forming performance. On the other hand, when the value is below the lower limit of −2.0, it is easy to secure the back focal length. However, it is difficult to downsize the imaging lens. In addition, the axial chromatic aberration and the chromatic aberration of magnification are both excessively corrected. In the astigmatism, the sagittal image surface tilts to the object side and the astigmatic difference increases. The distortion increases in a negative direction. Therefore, also in this case, it is difficult to obtain satisfactory image-forming performance.

When the whole lens system has the focal length f and a distance along the optical axis between the fourth lens and the fifth lens is D45, the imaging lens having the above-described configuration preferably satisfies the following conditional expression (7):

$$0.05 < D45/f < 0.2 \quad (7)$$

When the imaging lens satisfies the conditional expression (7), it is possible to restrain the chromatic aberration, the distortion, and the field curvature within satisfactory ranges in a balanced manner. When the value exceeds the upper limit of 0.2, the axial chromatic aberration and the chromatic aberration of magnification are both excessively corrected and the distortion increases in a positive direction. In addition, the image-forming surface curves to the image plane side, and the field curvature is excessively corrected. Therefore, it is difficult to obtain satisfactory image-forming performance. On the other hand, when the value is below the lower limit of 0.05, it is easy to secure the back focal length. However, it is difficult to downsize the imaging lens. The axial chromatic aberration and the chromatic aberration of magnification are both insufficiently corrected. In addition, the distortion increases and the field curvature is insufficiently corrected. Therefore, it is difficult to obtain satisfactory image-forming performance.

When the fourth lens has an Abbe's number vd4 and the fifth lens has an Abbe's number vd5, the imaging lens having the above-described configuration preferably satisfies the following conditional expressions (8) and (9):

$$40 < vd4 < 75 \quad (8)$$

$$15 < vd5 < 35 \quad (9)$$

When the imaging lens satisfies the conditional expressions (8) and (9), it is achievable to more satisfactorily correct the chromatic aberration.

When the fifth lens has positive refractive power and a focal length f5 and the sixth lens has a focal length f6, the imaging lens having the above-described configuration preferably satisfies the following conditional expression (10):

$$-6.0 < f5/f6 < -1.5 \quad (10)$$

When the imaging lens satisfies the conditional expression (10), it is achievable to satisfactorily correct the chromatic aberration, the astigmatism, and the distortion. When the value exceeds the upper limit of −1.5, it is easy to correct the chromatic aberration. However, since the distortion increases in a positive direction, it is difficult to obtain satisfactory image-forming performance. On the other hand, when the value is below the lower limit of −6.0, it is easy to correct the distortion. However, the axial chromatic aberration and the chromatic aberration of magnification are both excessively corrected. Moreover, in the astigmatism, the sagittal image surface tilts to the object side and the astigmatic difference increases. Therefore, it is difficult to obtain satisfactory image-forming performance.

In the imaging lens having the above-described configuration, when the fifth lens has positive refractive power, the second lens preferably has an object-side surface and an image plane-side surface, which have both positive curvature radii. The fifth lens preferably has an object-side surface, which has positive curvature radius.

According to the present invention, as described above, the shapes of the lenses are specified using positive/negative signs of the curvature radii thereof. Whether the curvature radius of the lens is positive or negative is determined based on general definition. More specifically, taking a traveling direction of light as positive, if a center of a curvature radius is on the image plane side when viewed from a lens surface, the curvature radius is positive. If a center of a curvature radius is on the object side, the curvature radius is negative. Therefore, "an object side surface, a curvature radius of which is positive" means the object side surface is a convex surface. "An object side surface, a curvature radius of which is negative" means the object side surface is a concave surface. "An image plane side surface, a curvature radius of which is positive" means the image plane side surface is a concave surface. "An image plane side surface, a curvature radius of which is negative" means the image plane side surface is a convex surface. Here, a curvature radius used herein refers to a paraxial curvature radius, and may not fit to general shapes of the lenses in their sectional views all the time.

When the fifth lens has negative refractive power and has a focal length f5, and the sixth lens has a focal length f6, the imaging lens having the above-described configuration preferably satisfies the following conditional expression (11):

$$5 < f5/f6 < 20 \quad (11)$$

When the imaging lens satisfies the conditional expression (11), it is achievable to satisfactorily correct the chromatic aberration, the field curvature, and the distortion in a balanced manner. When the value exceeds the upper limit of 20, it is easy to correct the chromatic aberration and the distortion. However, the field curvature is insufficiently corrected. Therefore, it is difficult to obtain satisfactory image-forming performance. On the other hand, when the value is below the lower limit of 5, the axial chromatic aberration and the chromatic aberration of magnification are both excessively corrected. In addition, the distortion increases in a positive direction. Therefore, it is difficult to obtain satisfactory image-forming performance.

In the imaging lens having the above-described configuration, when the fifth lens has negative refractive power, the fifth lens preferably has an image plane-side surface, which has positive curvature radius.

According to the imaging lens of the present invention, it is possible to provide a small-sized imaging lens that is especially suitable for mounting in a small-sized camera, while having high resolution with satisfactory correction of aberrations.

DETAILED DESCRIPTION OF PREFERRED EMBODIMENTS

Hereunder, referring to the accompanying drawings, an embodiment of the present invention will be fully described.

FIGS. 1, 4, 7, 10, and 13 are schematic sectional views of the imaging lenses in Numerical Data Examples 1 to 5 according to the embodiment, respectively. Since the imaging lenses in those Numerical Data Examples have the same basic configuration, the lens configuration of the embodiment will be described with reference to the illustrative sectional view of Numerical Data Example 1.

Figure 1:
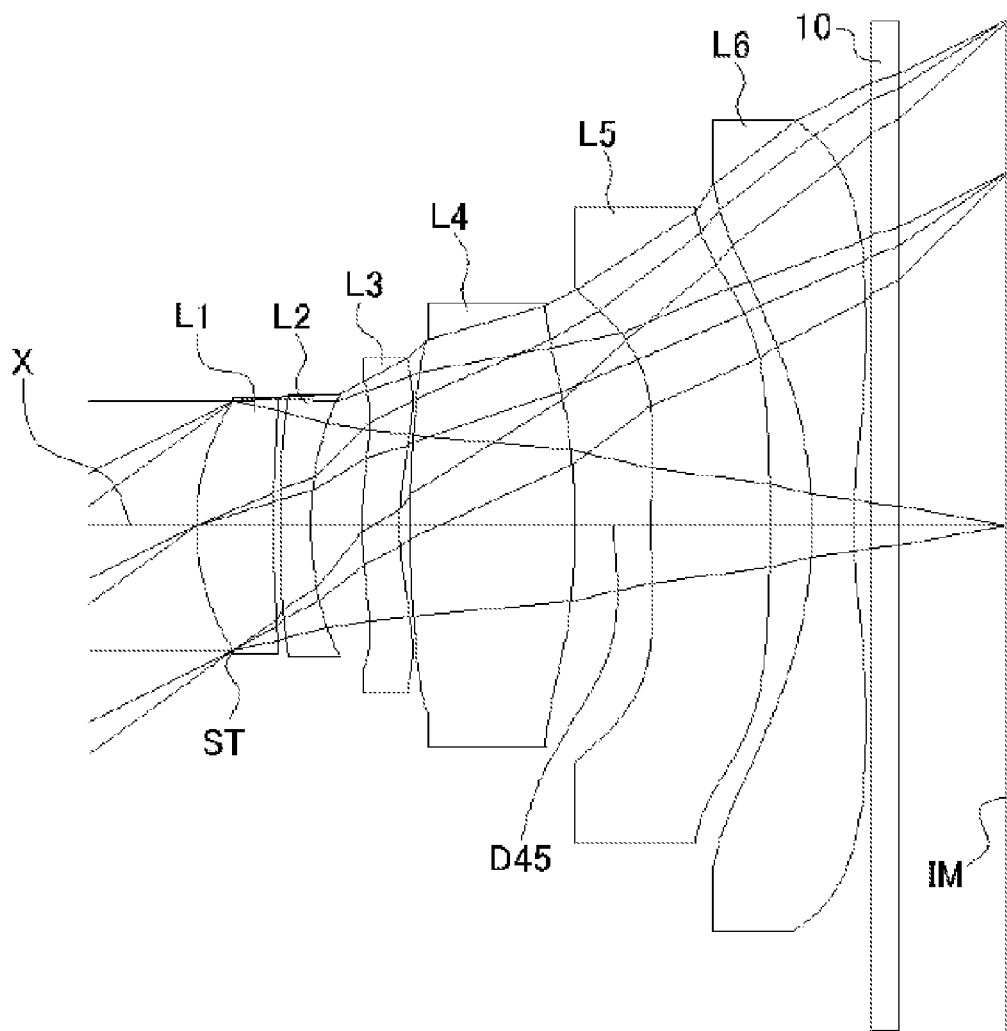
FIG. 1 shows a sectional view of a schematic configuration of an imaging lens in Numerical Data Example 1 according to an embodiment of the present invention.

As shown in FIG. 1, according to the embodiment, the imaging lens includes a first lens L1 having positive refractive power, a second lens L2 having negative refractive power, a third lens L3 having negative refractive power, a fourth lens L4, a fifth lens L5, and a sixth lens L6 having negative refractive power, arranged in the order from an object side to an image plane side. Between the sixth lens L6 and an image plane IM of an imaging element, there is provided a filter 10. The filter 10 is omissible.

The first lens L1 is formed in a shape such that a curvature radius r1 of an object-side surface thereof and a curvature radius r2 of an image plane-side surface thereof are both positive, so as to have a shape of a meniscus lens directing a convex surface thereof on an object side near an optical axis X. The shape of the first lens L1 is not limited to the one in Numerical Data Example 1. The first lens L1 can be formed in any shape, as long as the curvature radius r1 of the object-side surface thereof is positive. More specifically, the first lens L1 can also be formed in a shape such that the curvature radius r2 is negative.

Here, in the imaging lens according to the embodiment, for a purpose of improving ease in assembling of the imaging lens, an aperture stop ST is provided on the object side of the first lens L1. The position of the aperture stop ST is not limited to the one described in Numerical Data Example 1. For example, if the aperture stop ST is provided between the first lens L1 and the second lens L2, the presence of the imaging lens in a camera is emphasized. Therefore, it is possible to appeal to users by the luxurious impression, high lens performance, etc. as a part of design of the camera.

The second lens L2 is formed in a shape such that a curvature radius r3 of an object-side surface thereof and a curvature radius r4 of an image plane-side surface thereof are both positive, so as to have a shape of a meniscus lens directing a convex surface thereof to the object side near the optical axis X. The shape of the second lens L2 is not limited to the one in Numerical Data Example 1. The second lens L2 can be formed in any shape, as long as the curvature radius r4 of the image plane-side surface thereof is positive. More specifically, the second lens L2 can be formed in a shape such that the curvature radius r3 is negative.

The third lens L3 is formed in a shape such that a curvature radius r5 of an object-side surface thereof and a curvature radius r6 of an image plane-side surface thereof are both positive, so as to have a shape of a meniscus lens directing a convex surface thereof to the object side near the optical axis X. The shape of the third lens L3 is not limited to the one in Numerical Data Example 1. For example, the third lens L3 can also be formed in a shape such that the curvature radius r5 is negative and the curvature radius r6 is positive, i.e. a shape of a biconcave lens near the optical axis X.

The fourth lens L4 is formed in a shape such that a curvature radius r7 of an object-side surface thereof is positive and a curvature radius r8 of an image plane-side surface thereof is negative, so as to have a shape of a biconvex lens near the optical axis X. The shape of the fourth lens L4 is not limited to the one in Numerical Data Example 1. The fourth lens L4 can be formed so as to have a shape of a meniscus lens or of a biconcave lens near the optical axis X.

The fifth lens L5 is formed in a shape such that a curvature radius r9 of an object-side surface thereof is positive and a curvature radius r10 of an image plane-side surface thereof is negative, so as to have a shape of a biconvex lens near the optical axis X. The shape of the fifth lens L5 is not limited to the one in Numerical Data Example 1. The fifth lens L5 can be formed so as to have a shape of a meniscus lens or of a biconcave lens near the optical axis X. The fifth lens L5 of Numerical Data Example 4 is an example, in which the fifth lens L5 is formed in a shape of a biconcave lens near the optical axis X. The fifth lens L5 of Numerical Data Example 5 is an example, in which the fifth lens L5 is formed in a shape of a meniscus lens directing a convex surface thereof to the object side near the optical axis X.

In the imaging lens of Numerical Data Example 1, both the fourth lens L4 and the fifth lens L5 have positive refractive power. The arrangement of refractive powers of the fourth lens L4 and the fifth lens L5 is "positive-positive" in the order from the object side. However, the arrangement of the refractive powers of the fourth lens L4 and the fifth lens L5 is not limited to this "positive-positive", and the arrangement can be any, as long as composite refractive power of the fourth lens L4 and the fifth lens L5 is positive. The imaging lenses of Numerical Data Examples 4 and 5 are examples of lens configuration, in which the arrangement of the refractive powers is "positive-negative" in the order from the object side.

The sixth lens L6 is formed in a shape such that a curvature radius r11 of an object-side surface thereof is negative and a curvature radius r12 of an image plane-side surface thereof is positive, so as to have a shape of a biconcave lens near the optical axis X. The shape of the sixth lens L6 is not limited to the one in Numerical Data Example 1, and can be a shape of a meniscus lens near the optical axis X. The sixth lenses L6 of Numerical Data Examples 3 and 4 are examples, in which the sixth lens L6 is formed in a shape of a meniscus lens directing a convex surface thereof to the object side near the optical axis X. In addition, the sixth lens L6 can be also formed in a shape of a meniscus lens directing a concave surface thereof to the object side near the optical axis X.

In the sixth lens L6, the object-side surface thereof and the image plane-side surface thereof are formed as aspheric shapes having an inflexion point. With such shape of the sixth lens L6, it is achievable to satisfactorily correct off-axis chromatic aberration of magnification as well as the axial chromatic aberration. In addition, it is also achievable to suitably restrain an incident angle of a light beam emitted from the imaging lens to the image plane IM within the range of CRA.

According to the embodiment, the imaging lens satisfies the following conditional expressions (1) to (9):

$$0 < f45 \quad (1)$$

$$40 < vd3 < 75 \quad (2)$$

$$0.5 < f45/f < 2.5 \quad (3)$$

$$-1.2 < f1/f23 < -0.2 \quad (4)$$

$$-30 < f3/f < -10 \quad (5)$$

$$-2.0 < f6/f < 0.5 \quad (6)$$

$$0.05 < D45/f < 0.2 \quad (7)$$

$$40 < vd4 < 75 \quad (8)$$

$$15 < vd5 < 35 \quad (9)$$

In the above conditional expressions:
f: Focal length of a whole lens system
f1: Focal length of the first lens L1
f3: Focal length of the third lens L3
f6: Focal length of the sixth lens L6
f23: Composite focal length of the second lens L2 and the third lens L3
f45: Composite focal length of the fourth lens L4 and the fifth lens L5
D45: Distance on the optical axis X between the fourth lens L4 and the fifth lens L5
vd4: Abbe's number of the fourth lens L4
vd5: Abbe's number of the fifth lens L5

In addition, the imaging lenses of Numerical Data Examples 1 through 3 according to the embodiment further satisfy the following conditional expression (10). On the other hand, the imaging lenses of Numerical Data Examples 4 and 5, in which the fifth lens L5 has negative refractive power, satisfy the following conditional expression (11):

$$-6.0 < f5/f6 < -1.5 \quad (10)$$

$$5 < f5/f6 < 20 \quad (11)$$

In the above expressions, f5 is a focal length of the fifth lens L5.

Here, it is not necessary to satisfy all of the conditional expressions, and it is achievable to obtain an effect corresponding to the respective conditional expression when any single one of the conditional expressions is individually satisfied.

In the embodiment, all lens surfaces are formed as an aspheric surface. The aspheric shapes of the lens surfaces are expressed by the following formula:

$$Z = \frac{C \cdot H^2}{1 + \sqrt{1 - (1+k) \cdot C^2 \cdot H^2}} + \sum (An \cdot H^n) \quad \text{[Formula 1]}$$

In the above formula,
Z: Distance in a direction of the optical axis
H: Distance from the optical axis in a direction perpendicular to the optical axis
C: Paraxial curvature (=1/r, r: paraxial curvature radius)
k: Conic constant
An: The nth order aspheric coefficient Next, Numerical Data Examples of the imaging lens of the embodiment will be described. In each Numerical Data Example, f represents a focal length of the whole lens system, Fno represents an F-number, and ω represents a half angle of view, respectively. In addition, i represents a surface number counted from the object side, r represents a curvature radius, d represents a distance on the optical axis between lens surfaces (surface spacing), nd represents a refractive index, and vd represents an Abbe's number, respectively. Here, aspheric surfaces are indicated with surface numbers i affixed with * (asterisk).

Numerical Data Example 1

Basic Lens Data

TABLE 1

| | f = 5.39 mm Fno = 2.8 ω = 35.9° | | | | |
|---|---|---|---|---|---|
| | i | r | d | nd | vd [mm] |
| | | ∞ | ∞ | | |
| L1 | 1*(ST) | 1.803 | 0.599 | 1.5346 | 56.1 f1 = 3.446 |
| | 2* | 75.088 | 0.044 | | |
| L2 | 3* | 17.983 | 0.240 | 1.6355 | 23.9 f2 = −5.170 |
| | 4* | 2.763 | 0.392 | | |
| L3 | 5* | 2.835 | 0.294 | 1.5346 | 56.1 f3 = −56.589 |
| | 6* | 2.499 | 0.079 | | |
| L4 | 7* | 10.641 | 1.266 | 1.5346 | 56.1 f4 = 8.171 |
| | 8* | −7.103 | 0.586 (=D45) | | |
| L5 | 9* | 9.085 | 0.915 | 1.6355 | 23.9 f5 = 10.020 |
| | 10* | −20.460 | 0.326 | | |
| L6 | 11* | −3.909 | 0.327 | 1.5346 | 56.1 f6 = −3.805 |
| | 12* | 4.363 | 0.140 | | |
| | 13 | ∞ | 0.210 | 1.5168 | 64.2 |
| | 14 | ∞ | 0.824 | | |
| (IM) | | ∞ | | | | f23=−4.540 mm f45=4.790 mm

Aspheric Surface Data

TABLE 2

| i | k | A4 | A6 | A8 | A10 | A12 | A14 | A16 |
|---|---|---|---|---|---|---|---|---|
| 1 | 0 | 2.577E−03 | 1.491E−02 | −2.507E−02 | 1.004E−02 | 7.420E−03 | −5.583E−03 | −5.237E−04 |
| 2 | 0 | 1.968E−01 | −4.838E−01 | 5.798E−01 | −3.688E−01 | 1.006E−01 | 3.327E−03 | −5.583E−03 |
| 3 | 0 | 2.062E−01 | −5.050E−01 | 6.018E−01 | −3.339E−01 | 4.381E−02 | 3.039E−02 | −8.025E−03 |
| 4 | 0 | 4.758E−02 | −1.038E−01 | 1.479E−01 | −6.283E−02 | −5.044E−03 | 4.647E−03 | 3.424E−03 |
| 5 | 0 | −1.081E−01 | −5.340E−02 | 6.032E−02 | −5.856E−02 | 5.469E−02 | −4.127E−02 | 1.202E−02 |
| 6 | 0 | −9.592E−02 | −2.052E−02 | −1.480E−03 | 1.644E−02 | −1.316E−02 | 1.724E−03 | 1.396E−03 |
| 7 | 0 | −5.592E−04 | 2.119E−02 | −2.618E−02 | 9.699E−03 | −2.323E−04 | 3.632E−04 | −2.301E−04 |
| 8 | 0 | −4.649E−02 | 3.080E−02 | −1.554E−02 | 6.892E−03 | −4.493E−04 | −6.392E−04 | 1.364E−04 |
| 9 | 0 | −7.032E−02 | 8.799E−03 | −8.140E−03 | 9.721E−04 | 1.048E−03 | −4.594E−04 | 6.309E−05 |
| 10 | 0 | 2.830E−03 | −1.212E−02 | 1.612E−03 | 2.672E−05 | 9.905E−07 | 1.981E−08 | −1.506E−07 |
| 11 | 0 | −6.701E−03 | 1.791E−03 | 4.443E−05 | 5.991E−06 | −3.271E−06 | 1.764E−07 | 3.350E−09 |
| 12 | 0 | −5.308E−02 | 1.114E−02 | −1.312E−03 | 6.144E−05 | −2.698E−07 | 2.622E−08 | −7.225E−09 |

The values of the respective conditional expressions are as follows:

$f45/f=0.89$ $f1/f23=-0.76$ $f3/f=-10.50$ $f6/f=-0.71$ $D45/f=0.11$ $f5/f6=-2.63$

Accordingly, the imaging lens of Numerical Data Example 1 satisfies the above-described conditional expressions. The distance on the optical axis X from the object-side surface of the first lens L1 to the image plane IM (air conversion length for the filter 10) is 6.17 mm, and downsizing of the imaging lens is attained.

Figure 2:
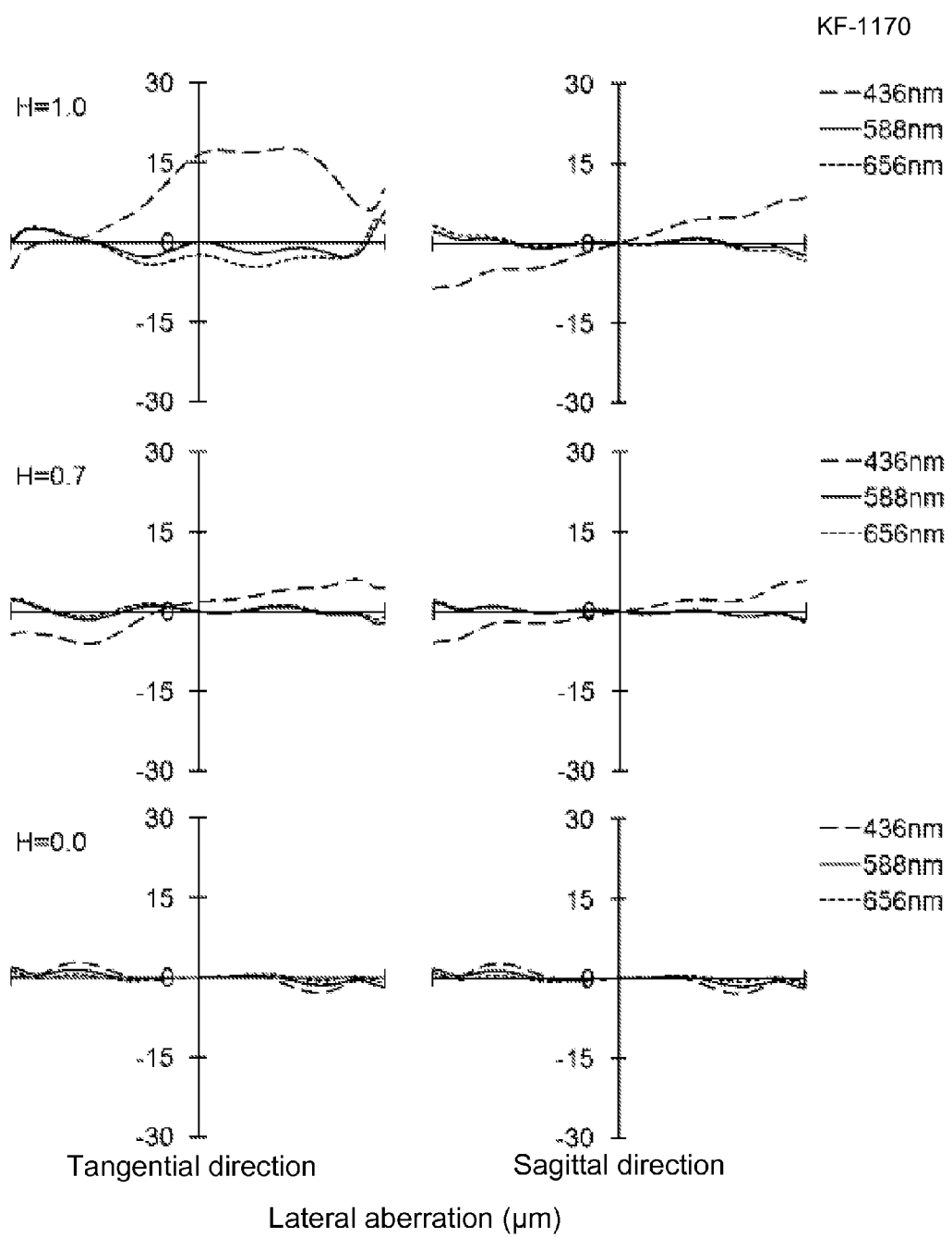
FIG. 2 is an aberration diagram showing a lateral aberration of the imaging lens of FIG. 1.
Figure 3:
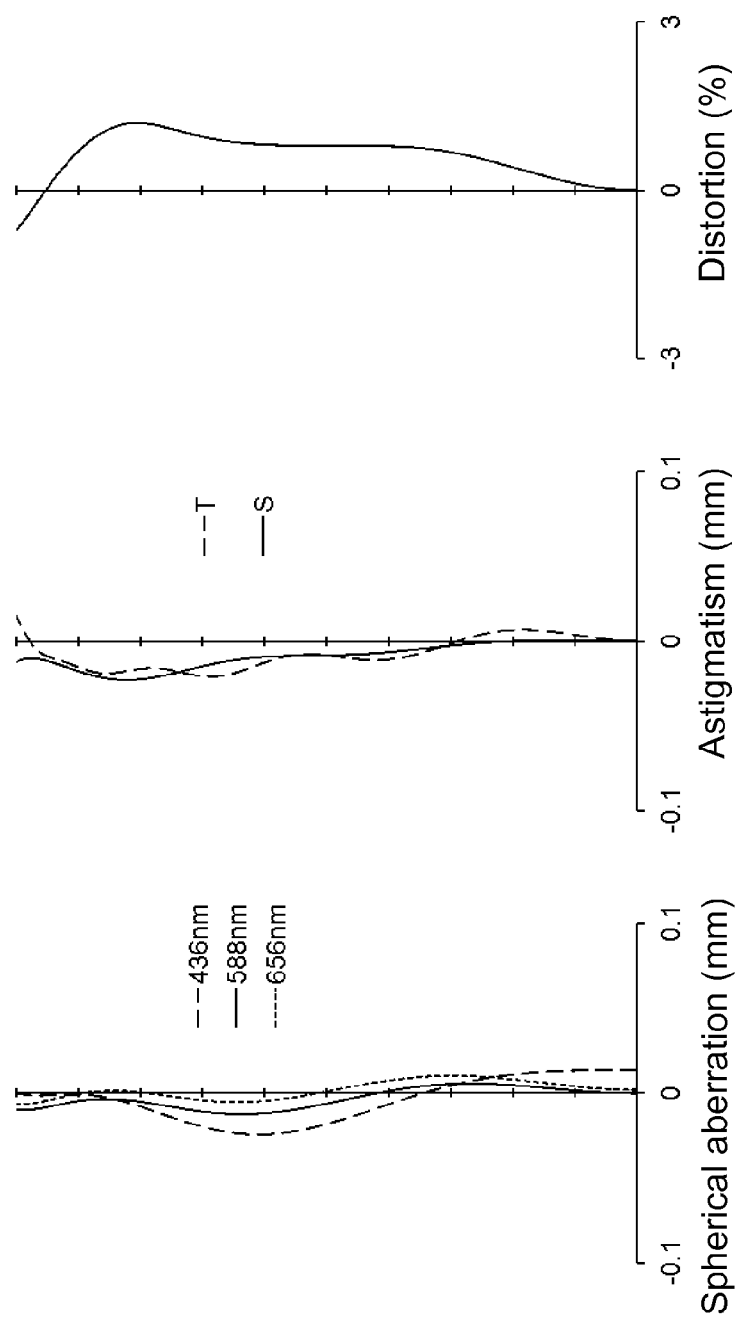
FIG. 3 is an aberration diagram showing a spherical aberration, astigmatism, and a distortion of the imaging lens of FIG. 1.
Figure 4:
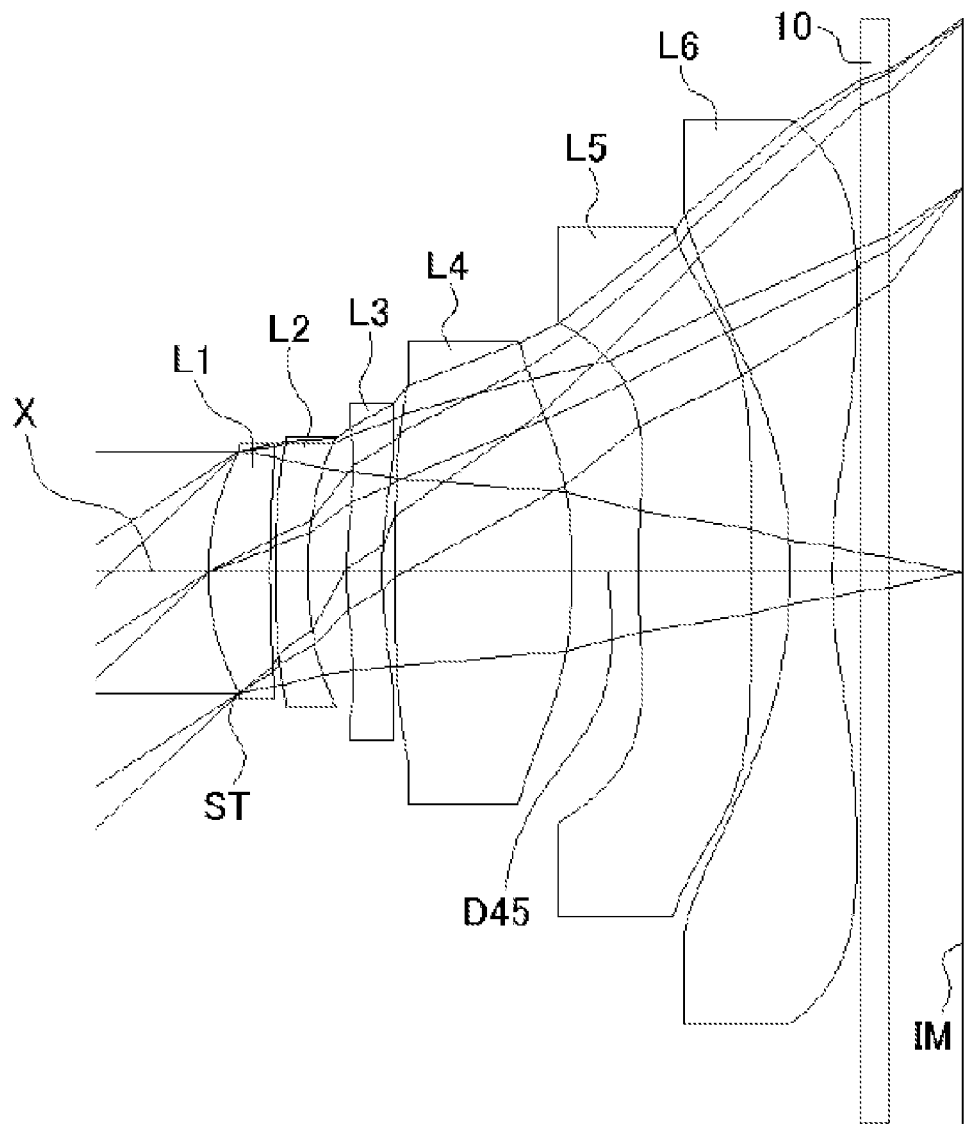
FIG. 4 shows a sectional view of a schematic configuration of an imaging lens in Numerical Data Example 2 according to the embodiment of the present invention.

FIG. 2 shows a lateral aberration that corresponds to a ratio H of each image height to the maximum image height (hereinafter referred to as "image height ratio H"), which is divided into a tangential direction and a sagittal direction (The same is true for FIGS. 5, 8, 11, and 14). Furthermore, FIG. 3 shows a spherical aberration (mm), astigmatism (mm), and a distortion (%), respectively. In the astigmatism diagram, an aberration on a sagittal image surface S and an aberration on a tangential image surface T are respectively indicated (The same is true for FIGS. 6, 9, 12, and 15). As shown in FIGS. 2 and 3, according to the imaging lens of Numerical Data Example 1, the aberrations are satisfactorily corrected.

Numerical Data Example 2

Basic Lens Data

TABLE 3

| f = 4.10 mm Fno = 2.4 ω = 43.5° | | | | | | |
|---|---|---|---|---|---|---|
| | i | r | d | nd | vd | [mm] |
| | | ∞ | ∞ | | | |
| L1 | 1*(ST) | 1.790 | 0.437 | 1.5346 | 56.1 | f1 = 3.487 |
| | 2* | 40.893 | 0.032 | | | |
| L2 | 3* | 10.028 | 0.230 | 1.6355 | 23.9 | f2 = −5.979 |
| | 4* | 2.731 | 0.274 | | | |
| L3 | 5* | 3.107 | 0.250 | 1.5346 | 56.1 | f3 = −115.582 |
| | 6* | 2.875 | 0.084 | | | |
| L4 | 7* | 13.890 | 1.257 | 1.5346 | 56.1 | f4 = 5.836 |
| | 8* | −3.897 | 0.463 | (=D45) | | |
| L5 | 9* | 5.658 | 0.792 | 1.6355 | 23.9 | f5 = 8.540 |
| | 10* | −125.958 | 0.280 | | | |
| L6 | 11* | −3.700 | 0.293 | 1.5346 | 56.1 | f6 = −3.283 |
| | 12* | 3.431 | 0.200 | | | |
| | 13 | ∞ | 0.210 | 1.5168 | 64.2 | |
| | 14 | ∞ | 0.517 | | | |
| (IM) | | ∞ | | | | |

$f23=-5.516$ mm $f45=3.636$ mm

Aspheric Surface Data

TABLE 4

| i | k | A4 | A6 | A8 | A10 | A12 | A14 | A16 |
|---|---|---|---|---|---|---|---|---|
| 1 | 0 | 4.405E−03 | 1.264E−02 | −2.786E−02 | 7.295E−03 | 4.204E−03 | −9.164E−03 | −5.064E−03 |
| 2 | 0 | 1.951E−01 | −4.906E−01 | 5.753E−01 | −3.719E−01 | 9.822E−02 | 3.144E−04 | −7.748E−03 |
| 3 | 0 | 2.055E−01 | −5.026E−01 | 6.028E−01 | −3.329E−01 | 4.557E−02 | 3.255E−02 | −6.339E−03 |
| 4 | 0 | 5.235E−02 | −1.032E−01 | 1.520E−01 | −6.042E−02 | −3.983E−03 | 4.823E−03 | 4.121E−03 |
| 5 | 0 | −1.137E−01 | −5.074E−02 | 6.169E−02 | −5.825E−02 | 5.457E−02 | −4.166E−02 | 1.137E−02 |
| 6 | 0 | −8.736E−02 | −1.853E−02 | −4.928E−04 | 1.702E−02 | −1.273E−02 | 2.054E−03 | 1.694E−03 |
| 7 | 0 | 1.833E−03 | 2.290E−02 | −2.537E−02 | 1.002E−02 | −2.126E−04 | 3.026E−04 | −3.031E−04 |
| 8 | 0 | −5.047E−02 | 3.146E−02 | −1.525E−02 | 6.970E−03 | −4.417E−04 | −6.395E−04 | 1.348E−04 |
| 9 | 0 | −7.988E−02 | 1.001E−02 | −8.404E−03 | 8.307E−04 | 1.019E−03 | −4.627E−04 | 6.435E−05 |
| 10 | 0 | 1.647E−03 | −1.225E−02 | 1.600E−03 | 2.566E−05 | 8.805E−07 | 1.014E−08 | −1.521E−07 |
| 11 | 0 | −5.806E−03 | 1.867E−03 | 5.148E−05 | 6.424E−06 | −3.327E−06 | 1.679E−07 | 1.180E−09 |
| 12 | 0 | −5.529E−02 | 1.079E−02 | −1.311E−03 | 6.495E−05 | −4.440E−07 | 1.105E−08 | −6.683E−09 |

The values of the respective conditional expressions are as follows:

$f45/f=0.89$ $f1/f23=-0.63$ $f3/f=-28.19$ $f6/f=-0.80$ $D45/f=0.11$ $f5/f6=-2.60$

Accordingly, the imaging lens of Numerical Data Example 2 satisfies the above-described conditional expressions. The distance on the optical axis X from the object-side surface of the first lens L1 to the image plane IM (air conversion length for the filter 10) is 5.25 mm, and downsizing of the imaging lens is attained.

Figure 5:
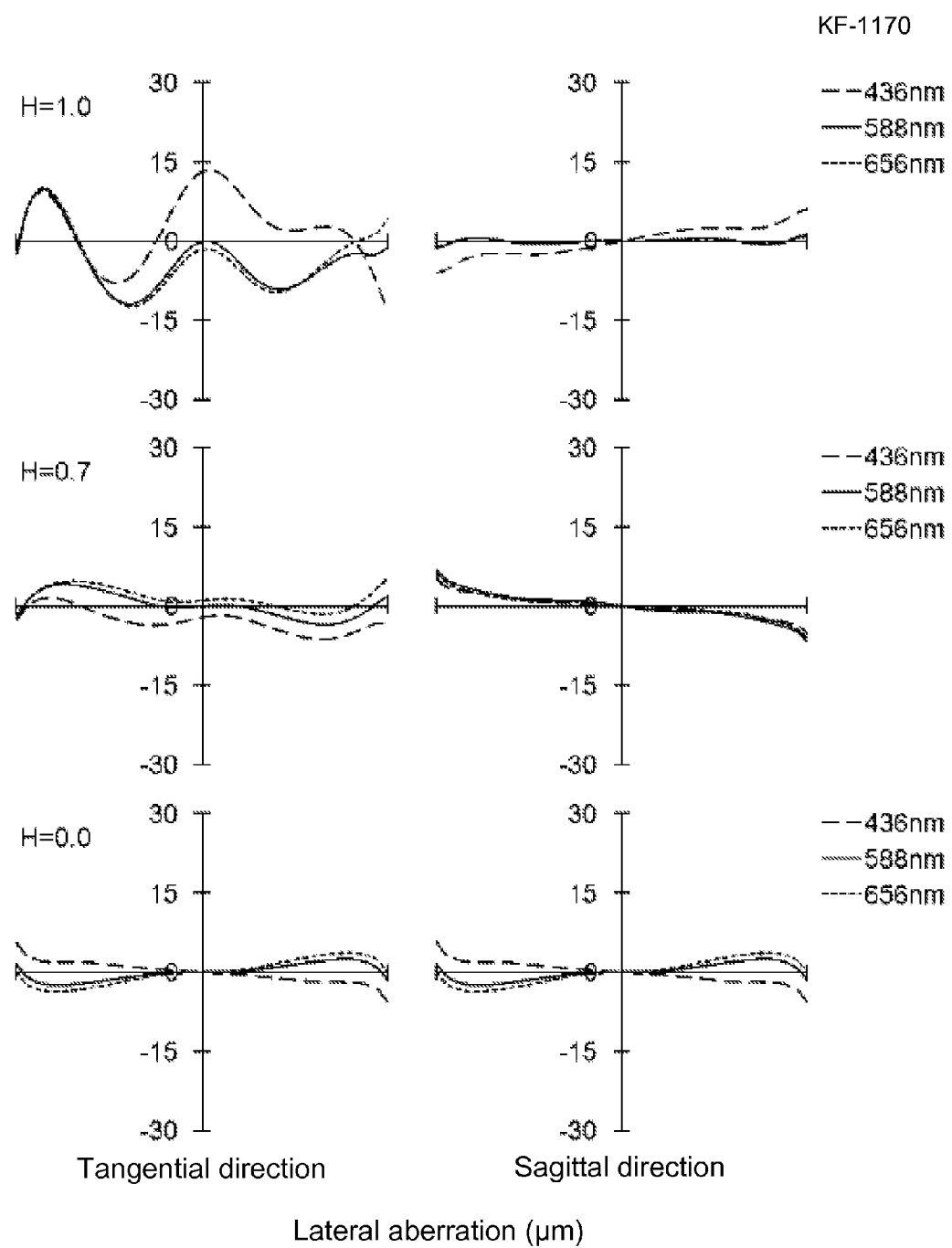
FIG. 5 is an aberration diagram showing a lateral aberration of the imaging lens of FIG. 4.
Figure 6:
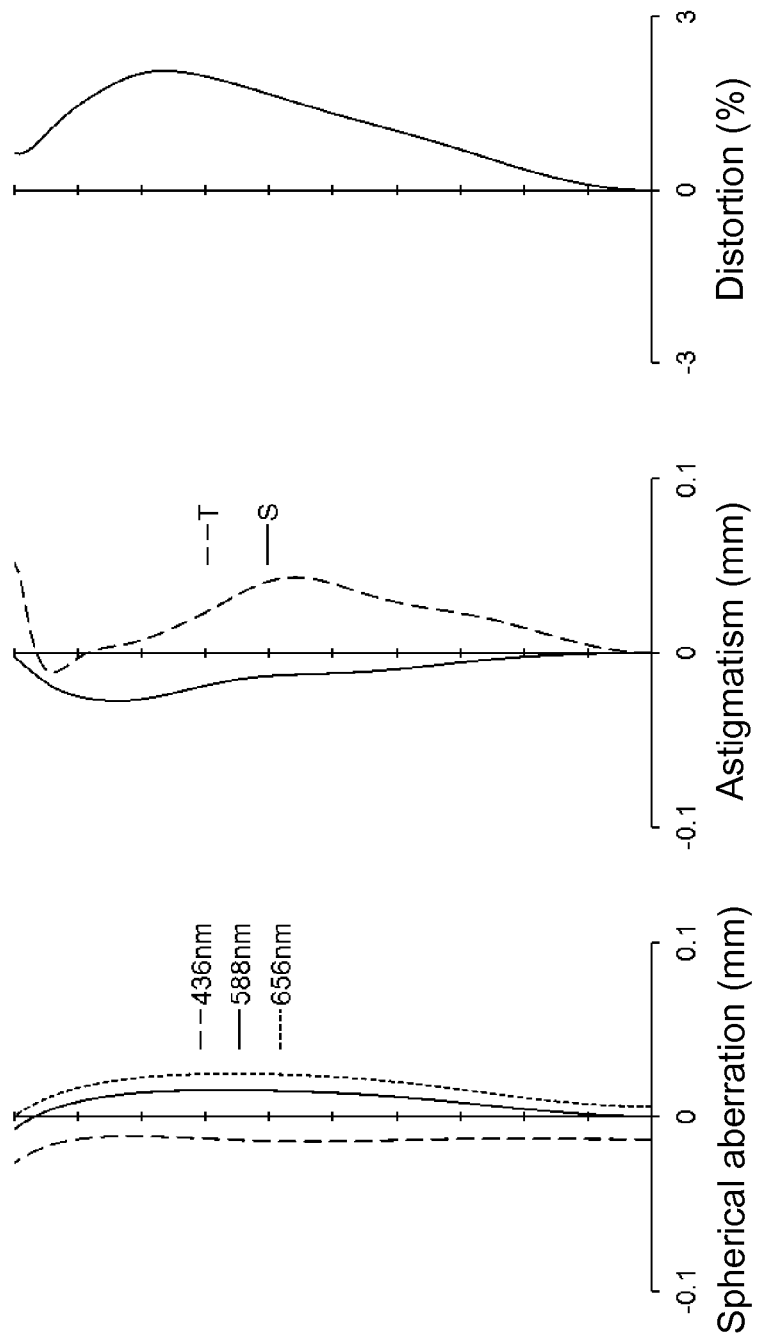
FIG. 6 is an aberration diagram showing a spherical aberration, astigmatism, and a distortion of the imaging lens of FIG. 4.
Figure 7:
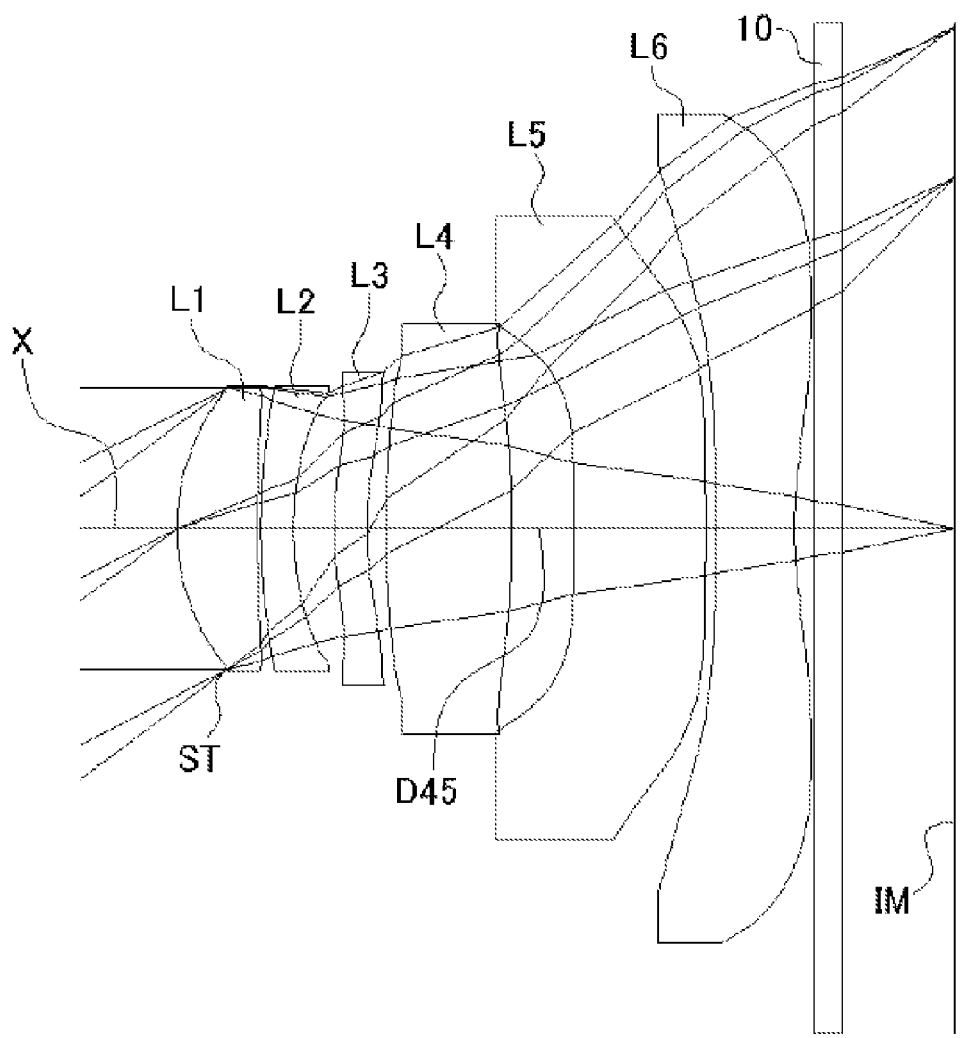
FIG. 7 shows a sectional view of a schematic configuration of an imaging lens in Numerical Data Example 3 according to the embodiment of the present invention.

FIG. 5 shows a lateral aberration that corresponds to the image height ratio H, and FIG. 6 shows a spherical aberration (mm), astigmatism (mm), and a distortion (%), respectively. As shown in FIGS. 5 and 6, according to the imaging lens of Numerical Data Example 2, the aberrations are also satisfactorily corrected.

Numerical Data Example 3

Basic Lens Data

TABLE 5

| | | | | | | |
|---|---|---|---|---|---|---|
| f = 5.25 mm Fno = 2.4 ω = 36.5° | | | | | | |
| | i | r | d | nd | vd | [mm] |
| L1 | 1*(ST) | ∞ 1.727 | ∞ 0.617 | 1.5346 | 56.1 | f1 = 3.389 |
| | 2* | 32.201 | 0.032 | | | |
| L2 | 3* | 9.306 | 0.253 | 1.6355 | 23.9 | f2 = −6.078 |
| | 4* | 2.701 | 0.313 | | | |
| L3 | 5* | 2.737 | 0.250 | 1.5346 | 56.1 | f3 = −57.265 |
| | 6* | 2.432 | 0.154 | | | |
| L4 | 7* | 10.599 | 0.963 | 1.5346 | 56.1 | f4 = 12.164 |
| | 8* | −16.293 | 0.483 | (=D45) | | |
| L5 | 9* | 28.554 | 1.019 | 1.6355 | 23.9 | f5 = 35.413 |
| | 10* | −104.758 | 0.074 | | | |
| L6 | 11* | 509.641 | 0.617 | 1.5346 | 56.1 | f6 = −7.131 |
| | 12* | 3.782 | 0.150 | | | |
| | 13 | ∞ | 0.210 | 1.5168 | 64.2 | |
| | 14 | ∞ | 0.879 | | | |
| (IM) | | ∞ | | | | |

$f23=-5.302$ mm $f45=9.249$ mm

Aspheric Surface Data

TABLE 6

| i | k | A4 | A6 | A8 | A10 | A12 | A14 | A16 |
|---|---|---|---|---|---|---|---|---|
| 1 | 0 | 2.275E−03 | 1.506E−02 | −2.502E−02 | 1.022E−02 | 7.481E−03 | −5.453E−03 | −8.124E−04 |
| 2 | 0 | 1.959E−01 | −4.860E−01 | 5.801E−01 | −3.682E−01 | 1.007E−01 | 2.512E−03 | −6.153E−03 |
| 3 | 0 | 2.046E−01 | −5.048E−01 | 6.007E−01 | −3.345E−01 | 4.385E−02 | 3.063E−02 | −8.429E−03 |
| 4 | 0 | 5.203E−02 | −1.042E−01 | 1.510E−01 | −6.225E−02 | −5.391E−03 | 4.785E−03 | 5.905E−03 |
| 5 | 0 | −1.060E−01 | −4.784E−02 | 6.187E−02 | −5.829E−02 | 5.494E−02 | −3.991E−02 | 1.413E−02 |
| 6 | 0 | −9.130E−02 | −1.970E−02 | −7.342E−05 | 1.771E−02 | −1.223E−02 | 2.304E−03 | 1.605E−03 |
| 7 | 0 | 5.377E−04 | 2.258E−02 | −2.567E−02 | 9.879E−03 | −2.336E−04 | 3.340E−04 | −2.582E−04 |
| 8 | 0 | −4.852E−02 | 3.138E−02 | −1.518E−02 | 6.993E−03 | −4.409E−04 | −6.411E−04 | 1.341E−04 |
| 9 | 0 | −8.287E−02 | 4.796E−03 | −9.858E−03 | 7.177E−04 | 1.049E−03 | −4.345E−04 | 7.745E−05 |
| 10 | 0 | −4.018E−03 | −1.192E−02 | 1.593E−03 | 2.292E−05 | 5.310E−07 | −6.085E−09 | −1.503E−07 |
| 11 | 0 | −2.087E−02 | 1.821E−03 | 5.452E−05 | 6.776E−06 | −3.291E−06 | 1.679E−07 | 1.106E−09 |
| 12 | 0 | −5.508E−02 | 1.107E−02 | −1.315E−03 | 6.066E−05 | −2.695E−07 | 2.391E−08 | −6.295E−09 |

The values of the respective conditional expressions are as follows:

$f45/f=1.76$ $f1/f23=-0.64$ $f3/f=-10.91$ $f6/f=-1.36$ $D45/f=0.09$ $f5/f6=-4.97$

Accordingly, the imaging lens of Numerical Data Example 3 satisfies the above-described conditional expressions. The distance on the optical axis X from the object-side surface of the first lens L1 to the image plane IM (air conversion length for the filter 10) is 5.94 mm, and downsizing of the imaging lens is attained.

Figure 8:
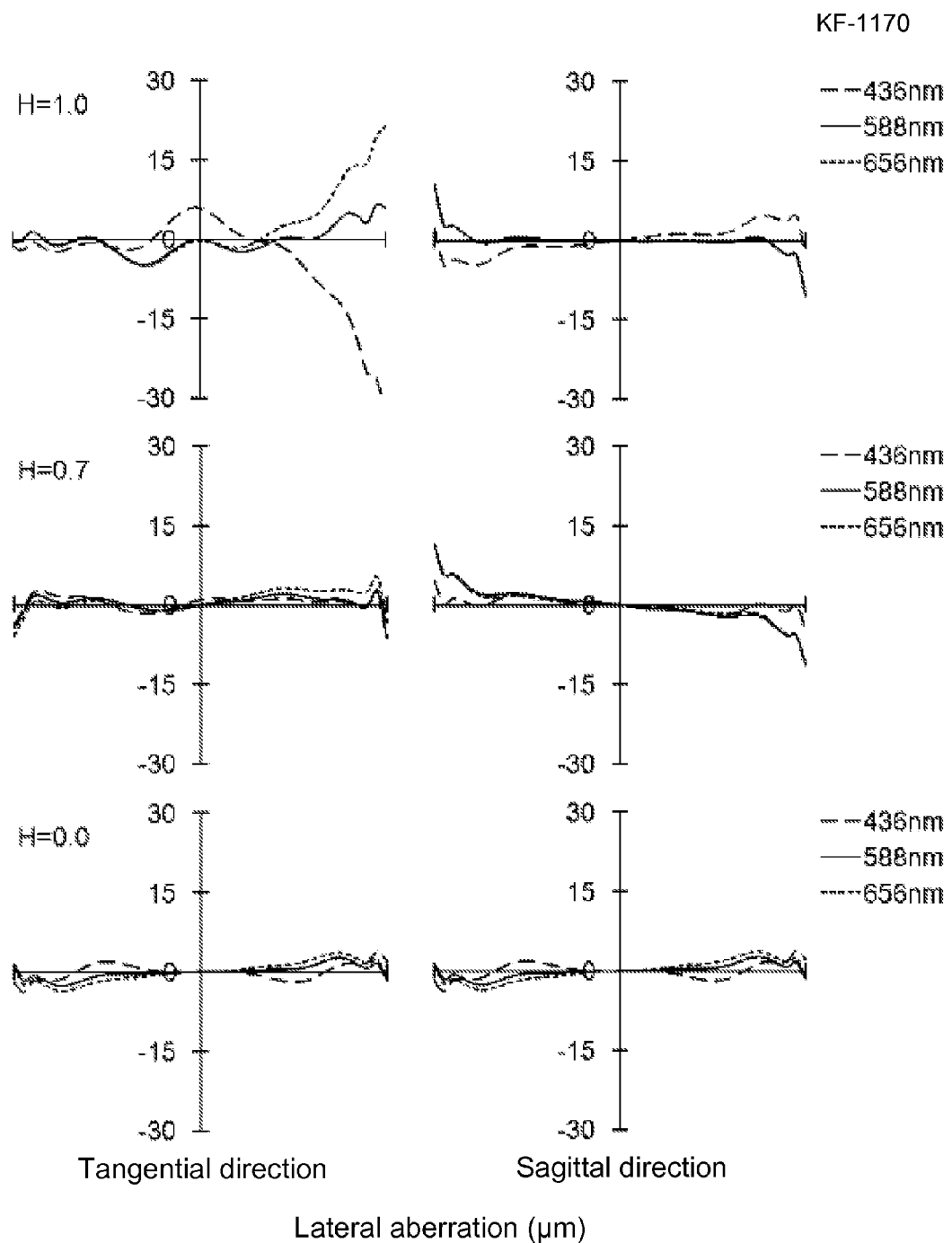
FIG. 8 is an aberration diagram showing a lateral aberration of the imaging lens of FIG. 7.
Figure 9:
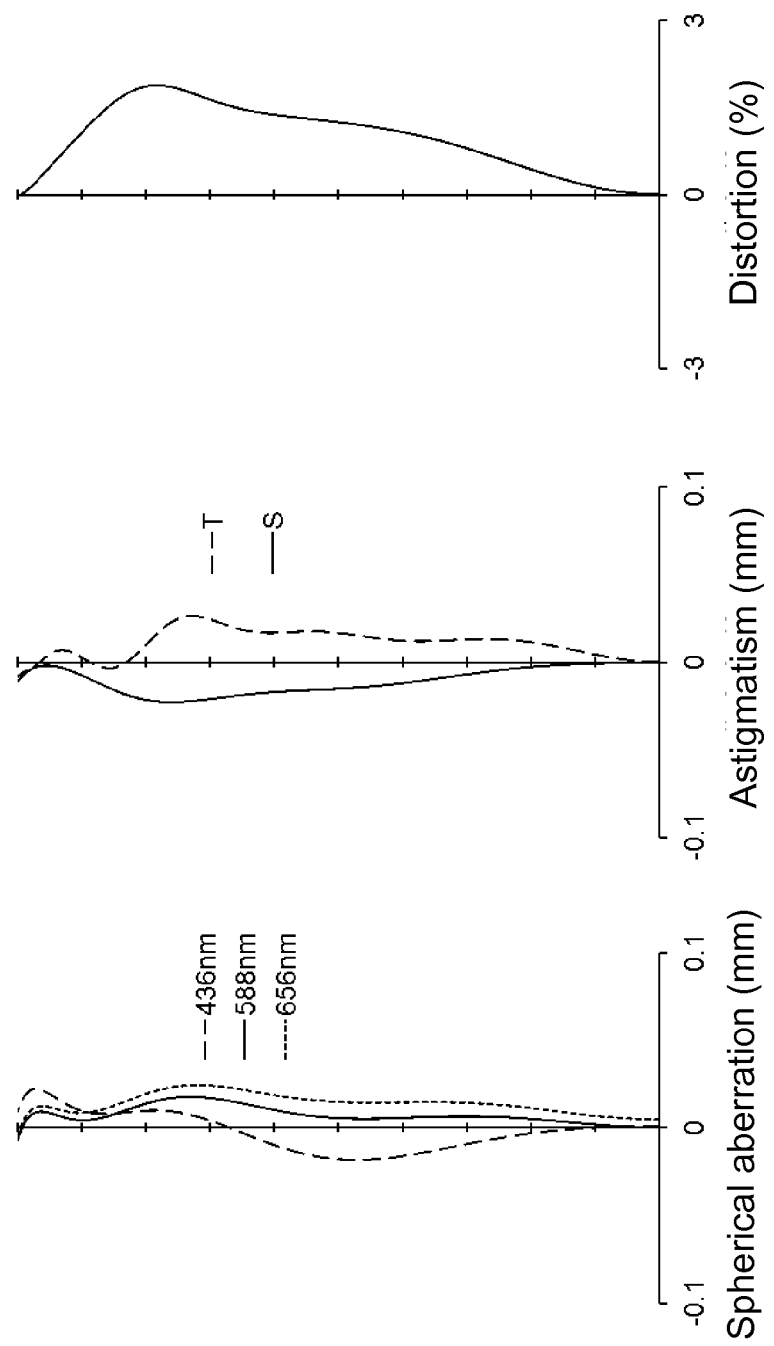
FIG. 9 is an aberration diagram showing a spherical aberration, astigmatism, and a distortion of the imaging lens of FIG. 7.
Figure 10:
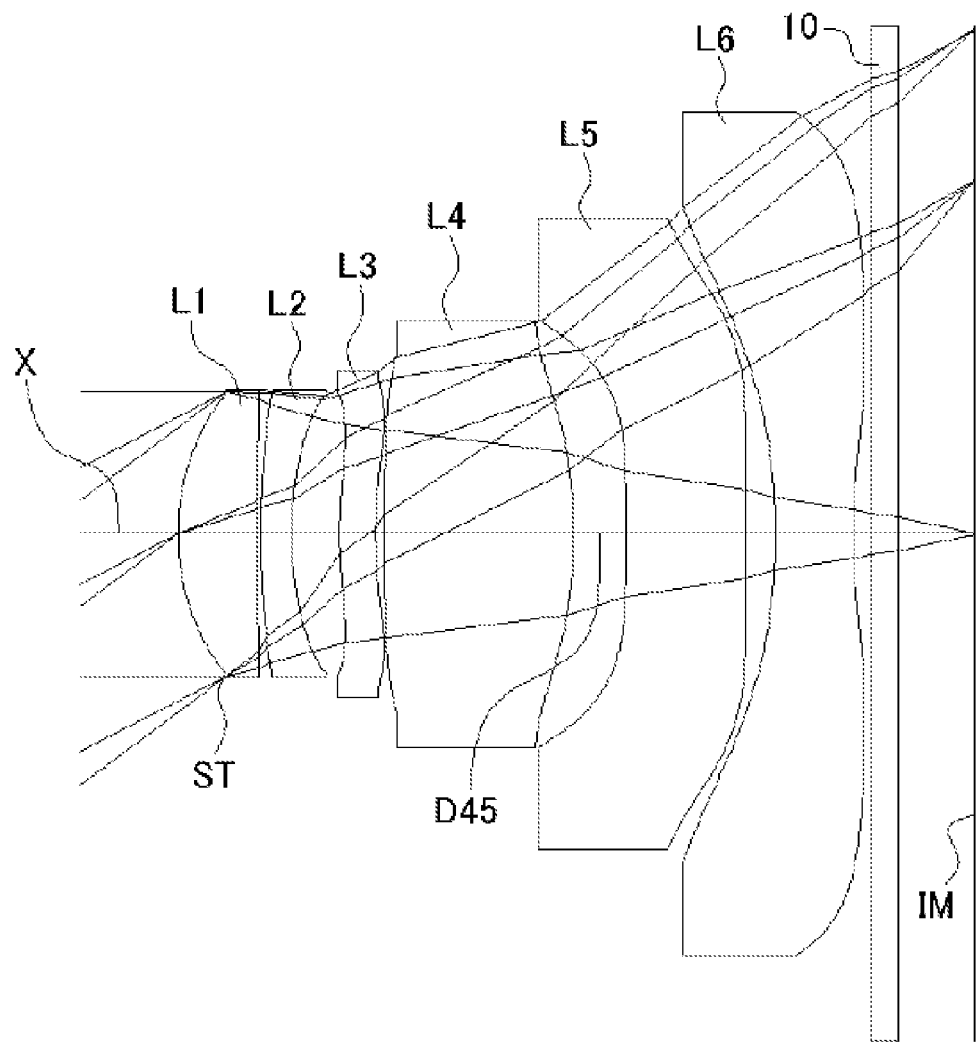
FIG. 10 shows a sectional view of a schematic configuration of an imaging lens in Numerical Data Example 4 according to the embodiment of the present invention.

FIG. 8 shows a lateral aberration that corresponds to the image height ratio H, and FIG. 9 shows a spherical aberration (mm), astigmatism (mm), and a distortion (%), respectively. As shown in FIGS. 8 and 9, according to the imaging lens of Numerical Data Example 3, the aberrations are also satisfactorily corrected.

Numerical Data Example 4

Basic Lens Data

TABLE 7

| | | | | | | |
|---|---|---|---|---|---|---|
| f = 5.25 mm Fno = 2.4 ω = 36.6° | | | | | | |
| | i | r | d | nd | vd | [mm] |
| L1 | 1*(ST) | ∞ 1.803 | ∞ 0.603 | 1.5346 | 56.1 | f1 = 3.453 |
| | 2* | 68.050 | 0.035 | | | |
| L2 | 3* | 14.055 | 0.239 | 1.6355 | 23.9 | f2 = −6.396 |
| | 4* | 3.132 | 0.365 | | | |
| L3 | 5* | 3.353 | 0.276 | 1.5346 | 56.1 | f3 = −100.229 |
| | 6* | 3.065 | 0.066 | | | |
| L4 | 7* | 22.643 | 1.457 | 1.5346 | 56.1 | f4 = 6.744 |
| | 8* | −4.192 | 0.407 | (=D45) | | |
| L5 | 9* | −102.110 | 0.918 | 1.6355 | 23.9 | f5 = −53.684 |
| | 10* | 51.413 | 0.227 | | | |

TABLE 7-continued

| | | f = 5.25 mm Fno = 2.4 ω = 36.6° | | | | |
|---|---|---|---|---|---|---|
| | i | r | d | nd | vd | [mm] |
| L6 | 11* | −5.045 | 0.598 | 1.5346 | 56.1 | f6 = −4.222 |
| | 12* | 4.252 | 0.140 | | | |
| | 13 | ∞ | 0.210 | 1.5168 | 64.2 | |
| | 14 | ∞ | 0.593 | | | |
| (IM) | | ∞ | | | | |

$f23 = -5.823$ mm $f45 = 7.563$ mm

Aspheric Surface Data

TABLE 8

| i | k | A4 | A6 | A8 | A10 | A12 | A14 | A16 |
|---|---|---|---|---|---|---|---|---|
| 1 | 0 | 4.510E−03 | 1.569E−02 | −2.478E−02 | 1.018E−02 | 7.283E−03 | −5.553E−03 | −7.502E−04 |
| 2 | 0 | 1.956E−01 | −4.863E−01 | 5.796E−01 | −3.685E−01 | 1.009E−01 | 2.645E−03 | −6.085E−03 |
| 3 | 0 | 2.044E−01 | −5.045E−01 | 6.015E−01 | −3.343E−01 | 4.369E−02 | 3.047E−02 | −8.225E−03 |
| 4 | 0 | 5.406E−02 | −1.035E−01 | 1.506E−01 | −6.187E−02 | −4.653E−03 | 4.647E−03 | 3.855E−03 |
| 5 | 0 | −1.078E−01 | −5.276E−02 | 5.994E−02 | −5.894E−02 | 5.489E−02 | −4.051E−02 | 1.299E−02 |
| 6 | 0 | −9.474E−02 | −1.903E−02 | −9.105E−04 | 1.656E−02 | −1.300E−02 | 1.987E−03 | 1.594E−03 |
| 7 | 0 | 3.512E−03 | 2.295E−02 | −2.536E−02 | 1.002E−02 | −2.174E−04 | 3.246E−04 | −2.636E−04 |
| 8 | 0 | −3.967E−02 | 3.052E−02 | −1.543E−02 | 6.986E−03 | −4.283E−04 | −6.357E−04 | 1.352E−04 |
| 9 | 0 | −8.058E−02 | 6.933E−03 | −8.491E−03 | 9.376E−04 | 1.056E−03 | −4.552E−04 | 6.504E−05 |
| 10 | 0 | −4.023E−03 | −1.187E−02 | 1.613E−02 | 2.357E−05 | 4.827E−07 | −6.750E−09 | −1.476E−07 |
| 11 | 0 | −1.169E−02 | 1.625E−03 | 5.718E−05 | 7.718E−06 | −3.251E−06 | 1.582E−07 | −1.603E−09 |
| 12 | 0 | −5.721E−02 | 1.191E−02 | −1.294E−03 | 5.632E−05 | −4.273E−07 | 3.294E−08 | −5.101E−09 |

The values of the respective conditional expressions are as follows:

$f45/f = 1.44$ $f1/f23 = -0.59$ $f3/f = -19.09$ $f6/f = -0.80$ $D45/f = 0.08$ $f5/f6 = 12.72$

Accordingly, the imaging lens of Numerical Data Example 4 satisfies the above-described conditional expressions. The distance on the optical axis X from the object-side surface of the first lens L1 to the image plane IM (air conversion length for the filter 10) is 6.06 mm, and downsizing of the imaging lens is attained.

Figure 11:
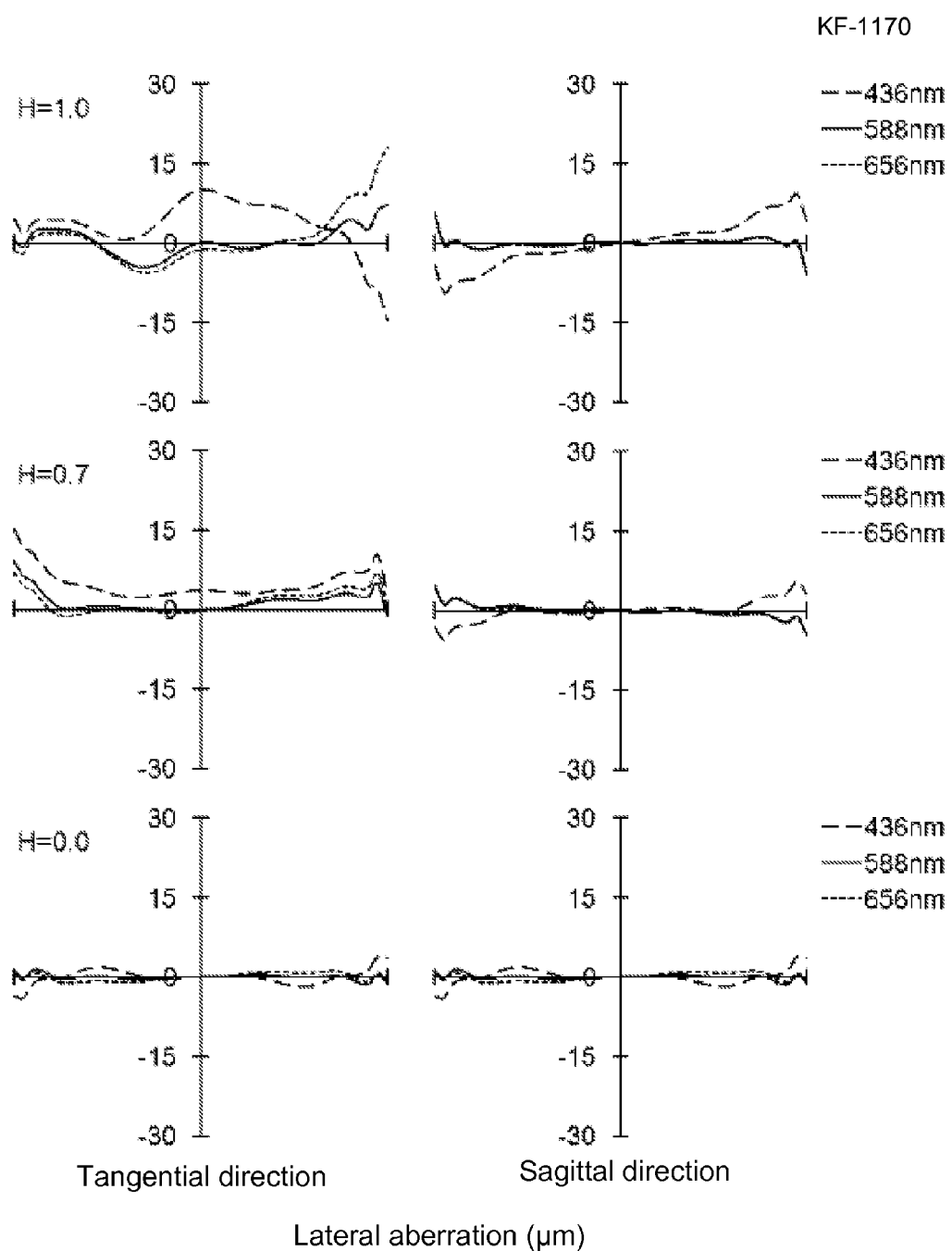
FIG. 11 is an aberration diagram showing a lateral aberration of the imaging lens of FIG. 10.
Figure 12:
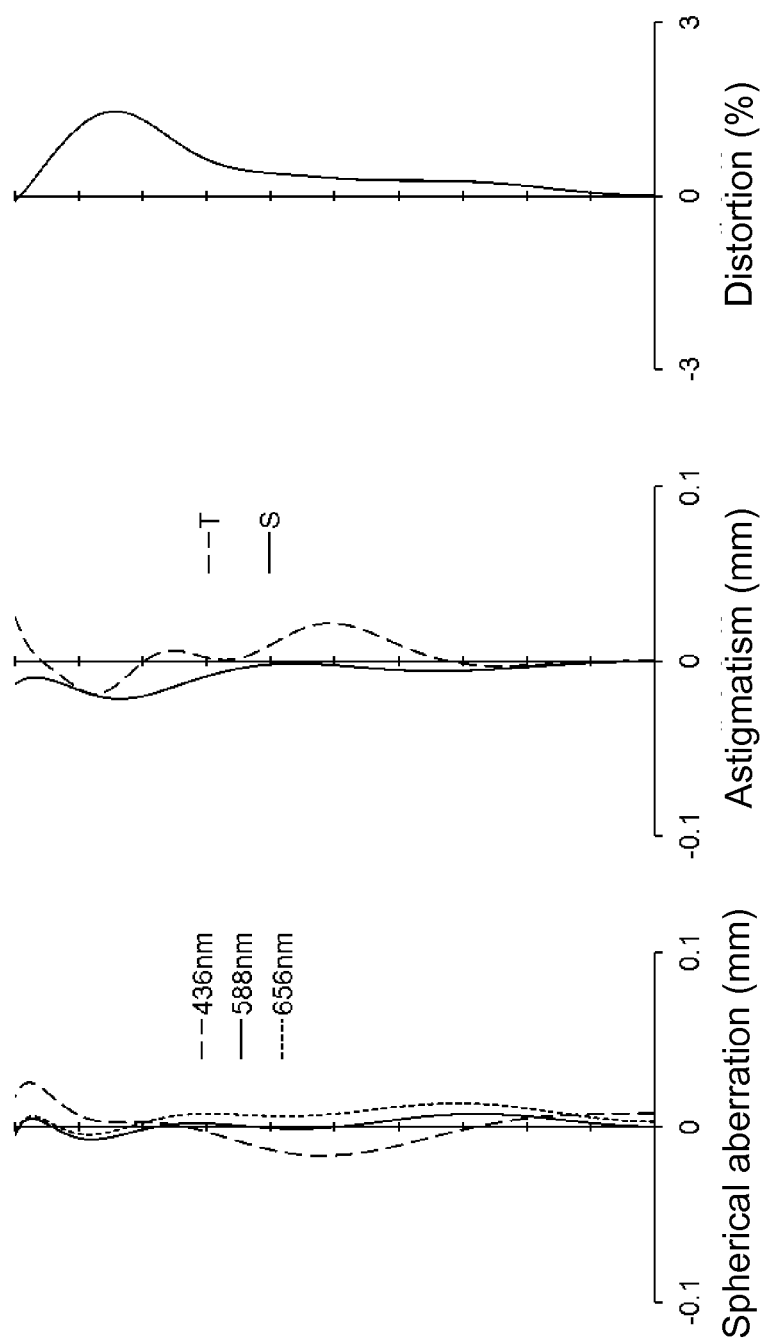
FIG. 12 is an aberration diagram showing a spherical aberration, astigmatism, and a distortion of the imaging lens of FIG. 10.
Figure 13:
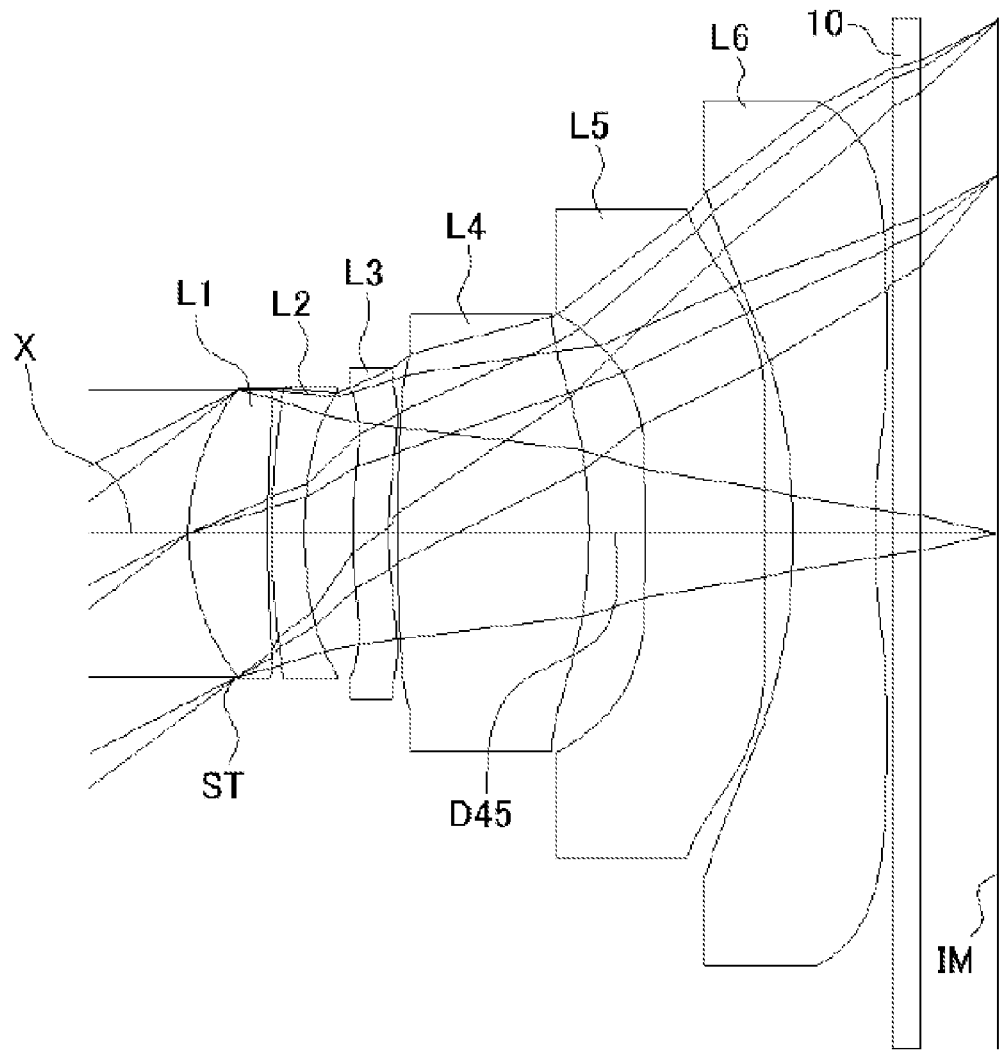
FIG. 13 shows a sectional view of a schematic configuration of an imaging lens in Numerical Data Example 5 according to the embodiment of the present invention.

FIG. 11 shows a lateral aberration that corresponds to the image height ratio H, and FIG. 12 shows a spherical aberration (mm), astigmatism (mm), and a distortion (%), respectively. As shown in FIGS. 11 and 12, according to the imaging lens of Numerical Data Example 4, the aberrations are also satisfactorily corrected.

Numerical Data Example 5

Basic Lens Data

TABLE 9

| | | f = 5.24 mm Fno = 2.4 ω = 36.6° | | | | |
|---|---|---|---|---|---|---|
| | i | r | d | nd | vd | [mm] |
| L1 | 1*(ST) | ∞<br>1.808 | ∞<br>0.599 | 1.5346 | 56.1 | f1 = 3.462 |
| | 2* | 69.814 | 0.035 | | | |

TABLE 9-continued

| | | f = 5.24 mm Fno = 2.4 ω = 36.6° | | | | |
|---|---|---|---|---|---|---|
| | i | r | d | nd | vd | [mm] |
| L2 | 3* | 14.102 | 0.239 | 1.6355 | 23.9 | f2 = −6.378 |
| | 4* | 3.128 | 0.367 | | | |
| L3 | 5* | 3.370 | 0.272 | 1.5346 | 56.1 | f3 = −100.228 |
| | 6* | 3.081 | 0.068 | | | |
| L4 | 7* | 22.344 | 1.449 | 1.5346 | 56.1 | f4 = 7.048 |
| | 8* | −4.429 | 0.426 | (=D45) | | |
| L5 | 9* | 53.314 | 0.899 | 1.6355 | 23.9 | f5 = −59.492 |
| | 10* | 21.976 | 0.224 | | | |
| L6 | 11* | −5.646 | 0.616 | 1.5346 | 56.1 | f6 = −4.360 |
| | 12* | 4.120 | 0.140 | | | |
| | 13 | ∞ | 0.210 | 1.5168 | 64.2 | |
| | 14 | ∞ | 0.593 | | | |
| (IM) | | ∞ | | | | |

$f23 = -5.811$ mm $f45 = 7.768$ mm

Aspheric Surface Data

TABLE 10

| i | k | A4 | A6 | A8 | A10 | A12 | A14 | A16 |
|---|---|---|---|---|---|---|---|---|
| 1 | 0 | 4.557E−03 | 1.553E−02 | −2.487E−02 | 1.014E−02 | 7.287E−03 | −5.548E−03 | −7.427E−04 |
| 2 | 0 | 1.957E−01 | −4.863E−01 | 5.797E−01 | −3.684E−01 | 1.009E−01 | 2.639E−03 | −6.075E−03 |
| 3 | 0 | 2.043E−01 | −5.043E−01 | 6.015E−01 | −3.343E−01 | 4.371E−02 | 3.051E−02 | −8.238E−03 |
| 4 | 0 | 5.405E−02 | −1.039E−01 | 1.503E−01 | −6.189E−02 | −4.700E−03 | 4.611E−03 | 3.742E−03 |
| 5 | 0 | −1.078E−01 | −5.283E−02 | 5.993E−02 | −5.901E−02 | 5.484E−02 | −4.046E−02 | 1.300E−02 |
| 6 | 0 | −9.475E−02 | −1.889E−02 | −9.223E−04 | 1.652E−02 | −1.303E−02 | 2.006E−03 | 1.614E−03 |

TABLE 10-continued

| i | k | A4 | A6 | A8 | A10 | A12 | A14 | A16 |
|---|---|---|---|---|---|---|---|---|
| 7 | 0 | 3.665E−03 | 2.288E−02 | −2.544E−02 | 9.969E−03 | −2.296E−04 | 3.257E−04 | −2.577E−04 |
| 8 | 0 | −3.951E−02 | 3.025E−02 | −1.547E−02 | 6.984E−03 | −4.257E−04 | −6.366E−04 | 1.345E−04 |
| 9 | 0 | −8.063E−02 | 6.828E−03 | −8.469E−03 | 9.513E−04 | 1.058E−03 | −4.560E−04 | 6.425E−05 |
| 10 | 0 | −5.865E−03 | −1.177E−02 | 1.617E−03 | 2.259E−05 | 3.791E−07 | −7.731E−09 | −1.444E−07 |
| 11 | 0 | −1.229E−02 | 1.641E−03 | 6.462E−05 | 8.296E−06 | −3.238E−06 | 1.512E−07 | −3.683E−09 |
| 12 | 0 | −5.783E−02 | 1.199E−02 | −1.296E−03 | 5.588E−05 | −4.218E−07 | 3.508E−08 | −5.051E−09 |

The values of the respective conditional expressions are as follows:

$$f45/f=1.48$$

$$f1/f23=-0.60$$

$$f3/f=-19.13$$

$$f6/f=-0.83$$

$$D45/f=0.08$$

$$f5/f6=13.64$$

Accordingly, the imaging lens of Numerical Data Example 5 satisfies the above-described conditional expressions. The distance on the optical axis X from the object-side surface of the first lens L1 to the image plane IM (air conversion length for the filter 10) is 6.07 mm, and downsizing of the imaging lens is attained.

Figure 14:
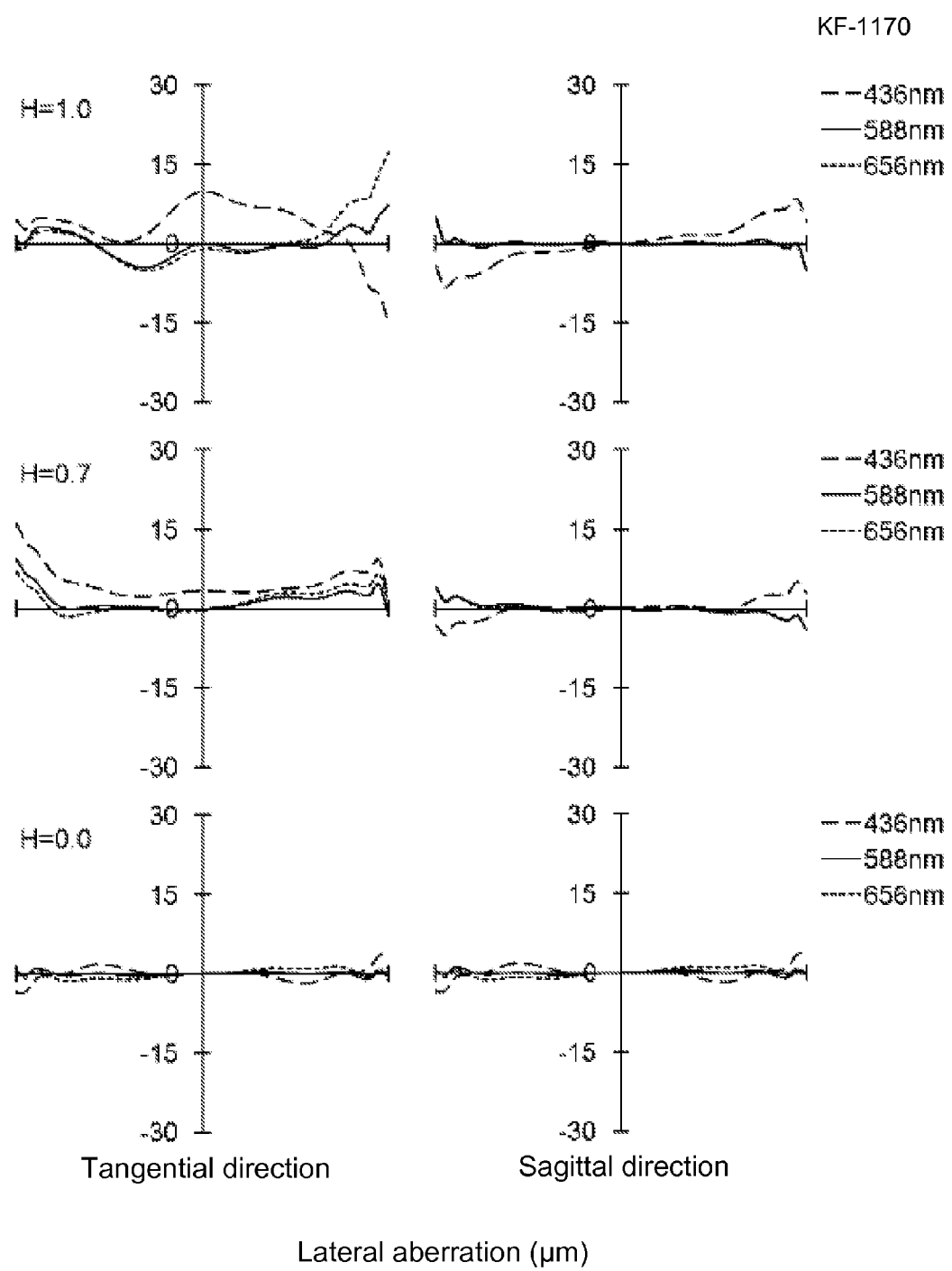
FIG. 14 is an aberration diagram showing a lateral aberration of the imaging lens of FIG. 13.
Figure 15:
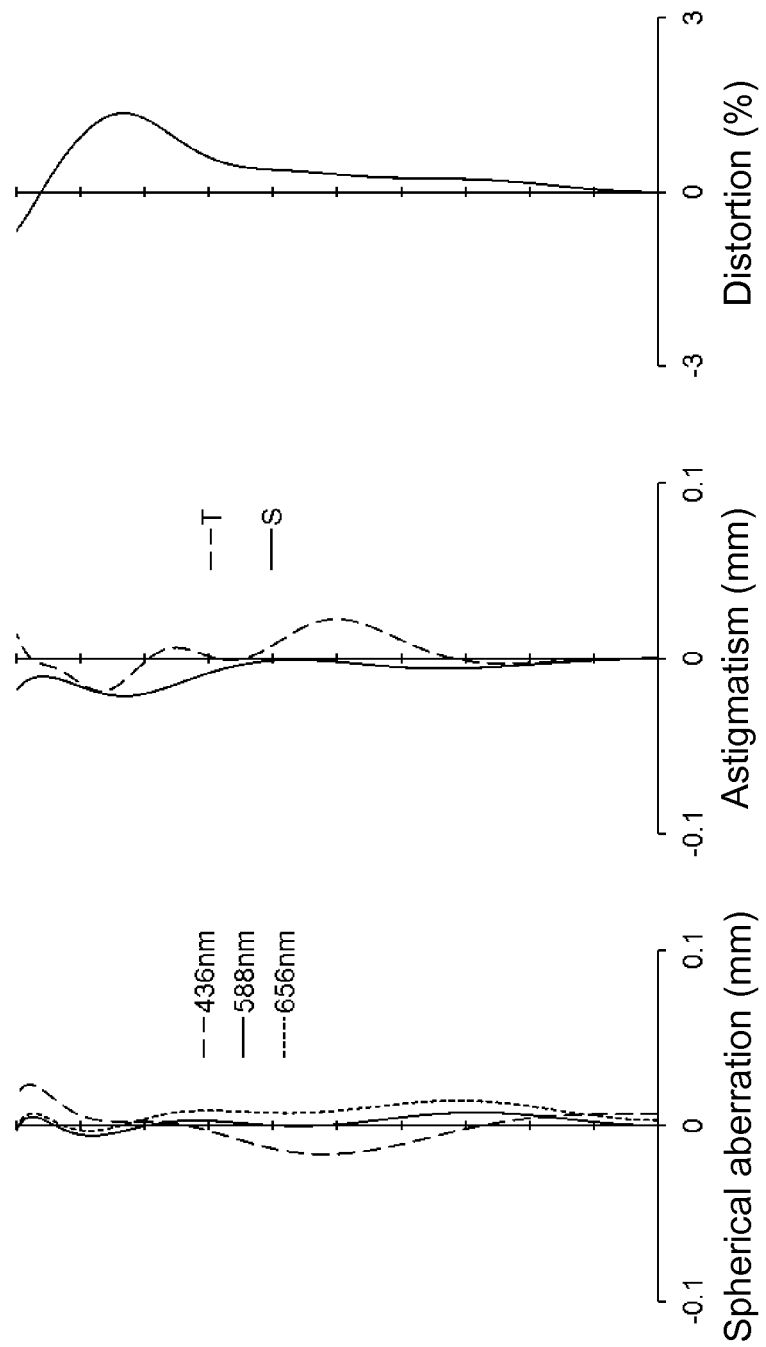
FIG. 15 is an aberration diagram showing a spherical aberration, astigmatism, and a distortion of the imaging lens of FIG. 13.

FIG. 14 shows a lateral aberration that corresponds to the image height ratio H, and FIG. 15 shows a spherical aberration (mm), astigmatism (mm), and a distortion (%), respectively. As shown in FIGS. 14 and 15, according to the imaging lens of Numerical Data Example 5, the aberrations are also satisfactorily corrected.

As described above, according to the imaging lens of the embodiment described above, it is achievable to have very wide angle of view (2ω) of 70° or greater. According to Numerical Data Examples 1 to 5, the imaging lenses have wide angles of view of 71.8° to 87.0°. According to the imaging lens of the embodiment, it is possible to take an image over a wider range than that taken by a conventional imaging lens.

Moreover, in these years, with advancement in digital zoom technology, which enables to enlarge any area of an image obtained through an imaging lens by image processing, an imaging element having a high pixel count is often used in combination with a high-resolution imaging lens. In case of such an imaging element with a high pixel count, a light-receiving area of each pixel often decreases, so that an image tends to be dark. According to the imaging lenses of Numerical Data Examples 1 to 5, the Fnos are as small as 2.4 to 2.8. According to the imaging lens of the embodiment, it is possible to obtain a sufficiently bright image, which can be suitably applied in the high-pixel imaging element described above.

Accordingly, when the imaging lens of the embodiment is mounted in an imaging optical system, such as cameras built in portable devices including cellular phones, portable information terminals, and smartphones, digital still cameras, security cameras, onboard cameras, and network cameras, it is possible to attain both high performance and downsizing of the cameras.

The present invention is applicable to an imaging lens to be mounted in relatively small cameras, such as cameras to be built in portable devices including cellular phones, smartphones, and portable information terminals, digital still cameras, security cameras, onboard cameras, and network cameras.

The disclosure of Japanese Patent Application No. 2015-087328, filed on Apr. 22, 2015, is incorporated in the application by reference.

While the present invention has been explained with reference to the specific embodiment of the present invention, the explanation is illustrative and the present invention is limited only by the appended claims.

What is claimed is:

1. An imaging lens comprising:
a first lens having positive refractive power;
a second lens having negative refractive power;
a third lens having negative refractive power;
a fourth lens;
a fifth lens formed of one single lens and having positive refractive power; and
a sixth lens formed of one single lens and having negative refractive power, arranged in this order from an object side to an image plane side with a space in between,
wherein said second lens is formed in a shape so that a surface thereof on the object side and a surface thereof on the image plane side have positive curvature radii,
said third lens is formed in a shape so that a surface thereof on the object side and a surface thereof on the image plane side have positive curvature radii,
said fifth lens is formed in a shape so that a surface thereof on the image plane side has a positive curvature radius,
said sixth lens is formed in a shape so that a surface thereof on the object side has a positive curvature radius,
said fourth lens and said fifth lens have a composite focal length f45, and said third lens has an Abbe's number vd3 so that the following conditional expressions are satisfied:

$$0<f45,$$

$$40<vd3<75.$$

2. The imaging lens according to claim 1, wherein said fourth lens and said fifth lens have the composite focal length f45 so that the following conditional expression is satisfied:

$$0.5<f45/f<2.5$$

where f is a focal length of a whole lens system.

3. The imaging lens according to claim 1, wherein said first lens has a focal length f1, and said second lens and said third lens have a composite focal length f23 so that the following conditional expression is satisfied:

$$-1.2<f1/f23<-0.2.$$

4. The imaging lens according to claim 1, wherein said third lens has a focal length f3 so that the following conditional expression is satisfied:

$$-30<f3/f<-10$$

where f is a focal length of a whole lens system.

5. The imaging lens according to claim 1, wherein said sixth lens has a focal length f6 so that the following conditional expression is satisfied:

$-2.0<f6/f<-0.5$ where f is a focal length of a whole lens system.

6. The imaging lens according to claim 1, wherein said fourth lens is disposed away from the fifth lens by a distance D45 on an optical axis thereof so that the following conditional expression is satisfied:

$0.05<D45/f<0.2$ where f is a focal length of a whole lens system.

7. The imaging lens according to claim 1, wherein said fifth lens has a focal length f5 and said sixth lens has a focal length f6 so that the following conditional expression is satisfied:

$-6.0<f5/f6<-1.5$.

8. An imaging lens comprising:
a first lens having positive refractive power;
a second lens having negative refractive power;
a third lens having negative refractive power;
a fourth lens;
a fifth lens formed of one single lens; and
a sixth lens formed of one single lens and having negative refractive power, arranged in this order from an object side to an image plane side with a space in between,
wherein said first lens is formed in a shape so that a surface thereof on the object side and a surface thereof on the image plane side have positive curvature radii,
said second lens is formed in a shape so that a surface thereof on the object side has a positive curvature radius,
said third lens is formed in a shape so that a surface thereof on the object side has a positive curvature radius,
said fourth lens is formed in a shape so that a surface thereof on the object side has a positive curvature radius and a surface thereof on the image plane side has a negative curvature radius,
said sixth lens is formed in a shape so that a surface thereof on the object side has a negative curvature radius, and
said fourth lens is disposed away from the fifth lens by a distance D45 on an optical axis thereof so that the following conditional expression is satisfied:

$0.08 \leq D45/f<0.2$ where f is a focal length of a whole lens system.

9. The imaging lens according to claim 8, wherein said fourth lens and said fifth lens have a composite focal length f45, and said third lens has an Abbe's number vd3 so that the following conditional expressions are satisfied:

$0<f45$, $40<vd3<75$.

10. The imaging lens according to claim 8, wherein said fourth lens and said fifth lens have a composite focal length f45 so that the following conditional expression is satisfied:

$0.5<f45/f<2.5$ where f is a focal length of a whole lens system.

11. The imaging lens according to claim 8, wherein said first lens has a focal length f1, and said second lens and said third lens have a composite focal length f23 so that the following conditional expression is satisfied:

$-1.2<f1/f23<-0.2$.

12. The imaging lens according to claim 8, wherein said third lens has a focal length f3 so that the following conditional expression is satisfied:

$-30<f3/f<-10$.

13. The imaging lens according to claim 8, wherein said sixth lens has a focal length f6 so that the following conditional expression is satisfied:

$-2.0<f6/f<-0.5$.

14. The imaging lens according to claim 8, wherein said fifth lens has positive refractive power, and
said fifth lens has a focal length f5 and said sixth lens has a focal length f6 so that the following conditional expression is satisfied:

$-6.0<f5/f6<-1.5$.

15. The imaging lens according to claim 8, wherein said fifth lens has negative refractive power, and
said fifth lens has a focal length f5 and said sixth lens has a focal length f6 so that the following conditional expression is satisfied:

$5<f5/f6<20$.

* * * * *